United States Patent [19]

Sealock et al.

[11] Patent Number: 5,783,829
[45] Date of Patent: Jul. 21, 1998

[54] ENERGY AND POSITION SENSITIVE RADIATION DETECTORS

[75] Inventors: Richard Sealock, Traralgon, Australia; Oscar Rondon-Aramayo, Charlottesville, Va.; Daniel Van Horn Bengis, College Park, Md.

[73] Assignee: The University of Virginia, Charlottesville, Va.

[21] Appl. No.: 744,763

[22] Filed: Nov. 6, 1996

Related U.S. Application Data

[60] Provisional application No. 60/007,331 Nov. 6, 1995.

[51] Int. Cl.$^6$ ........................................ G01T 1/20
[52] U.S. Cl. ................................. 250/367; 250/369
[58] Field of Search ............................... 250/366, 367, 250/368, 369

[56] References Cited

U.S. PATENT DOCUMENTS

| | | | |
|---|---|---|---|
| 4,829,185 | 5/1989 | Cerff | 250/368 X |
| 5,103,099 | 4/1992 | Bourdinaud et al. | 250/368 |
| 5,281,820 | 1/1994 | Croh et al. | 250/368 |
| 5,506,408 | 4/1996 | Vickers et al. | 250/368 |
| 5,600,144 | 2/1997 | Worstell | 250/367 X |

OTHER PUBLICATIONS

"Development of a High-Resolution Pet Detector using LSO and Wavelength-Shifting Fibers"; William Worstell, Olof Johnson, and Valery Zawarzin; Boston University Physics Dept.; (5) pages. No date.

"Scintillator Crystal Readout with Wavelength-Shifting Optical Fibers"; William Worstell, Steven Doulas, Olof Johnson, and Cheng-Ju Lin; Boston University Physics Dept.; Mar. 1995; pp. 1869-1873.

"Position SensitiveΔE Detector"; D.V.H. Bengis and R.M. Sealock; Dept Of Physics, University of Virginia; Mar. 1995; pp. 574-578.

*Primary Examiner*—David P. Porta
*Attorney, Agent, or Firm*—Oblon, Spivak, McClelland, Maier & Neustadt, P.C.

[57] ABSTRACT

A device and a method for determining the interaction position and energy measurement of a radiation detector. A plurality of waveshifting optical fiber are positioned on the surface of a scintillator which is subjected to incident radiation causing the release of photons of a first wavelength from the scintillator which are absorbed by the optical fiber with a portion of the released photons being reemitted from one end of the fibers. The reemitted photons are measured and the centroid of the distribution of these measured photons is determined in order to provide an indication of the interaction position of incident radiation. A measurement of photons generated by the incident radiation which pass through the fibers but which are not transported down said fibers provide an indication of the energy of the incident radiation. In a further embodiment, a crossed wire anode photomultiplier is used in conjunction with a plurality of scintillating fibers embedded in grooves on both sides of the scintillator in order to provide an accurate position for the centroid of a more extended distribution of incident photons. Furthermore a designed neural network extracts, from the crossed wire anode photomultiplier output pulses, a linear position to provide real time imaging.

10 Claims, 24 Drawing Sheets

SCINTILLATOR

WAVE SHIFTING FIBER OPTIC

ENERGY AND POSITION SENSITIVE RADIATION DETECTORS

This is a non-provisional application based on Provisional Application Ser. No. 60/007,331 filed Nov. 6, 1995.

FIELD OF THE INVENTION

Applicants' invention is addressed to the field of detection of radiation requiring the knowledge of the interaction position of the radiation, the energy of the radiation or both.

BACKGROUND OF THE INVENTION

Medical imaging with gamma-rays, industrial imaging with gamma-rays or neutrons and the determination of particle trajectories in nuclear and particle physics all require knowledge of the interaction position of the radiation and/or the energy of the radiation. The most commonly used gamma-ray detector for imaging is the Anger camera which is widely used in nuclear medicine. An experimental method called the Compton scattering imaging uses a position-sensitive germanium gamma-ray detector coupled with an Anger camera. These Anger cameras have also been used in neutron diffraction studies. Another type of position-sensitive neutron detector is the He filled multi-wire proportional chamber. Charged particle trajectory information in nuclear and particle physics is routinely achieved with multi-wire drift chambers and proportional chambers.

The primary measures of performance in medical or industrial imaging are the spatial resolution, the energy resolution and data acquisition rate. The spatial resolution of typical Anger camera images is approximately 8 millimeters which is determined jointly by the dimensions of the lead collimator used and the system of photomultipliers which detects the light from a large slab of NaI(Tl) scintillator. These two factors individually have spatial resolutions of approximately 6 millimeters although the collimator resolution can be reduced, at the expense of the counting efficiency, if the light detector resolution warrants such reduction. The spatial resolution varies over the surface of an Anger camera with the spatial resolution decreasing at the edges of the surface. Anger cameras are also used with pinhole collimators or reducing collimators. With both of these collimators, the resolution of the light detector is more important than it is for the standard parallel hole collimator. When an Anger camera is used with a magnifying collimator, the detection resolution is less important however the image is larger so that a constant resolution becomes an important feature.

SUMMARY OF THE INVENTION

It is a purpose of the present invention to provide improved spatial resolution in imaging with radiation to provide sharper images which contain more information and can be more accurately interpreted.

The present invention accomplishes this improved resolution by providing two independent and simultaneous images. One of the images has improved spatial resolution while the other has lowered spatial resolution but at the highest possible rate.

It is an object of the present invention to provide a device which has spatial resolution that is constant over the entire surface and which can be manufactured from several smaller pieces of scintillator which are not required to be arranged in a plane so that curved or cylindrical gamma cameras can be constructed according to the method of present invention.

It is another purpose of the present invention to provide for the use of thinner scintillators through the use of smaller pieces of scintillator.

It is also the purpose of the present invention to form a detector providing information on the depth in the scintillator at which uncharged radiation interacts in order to reject certain background.

It is also a further object of the present invention to provide a position-sensitive radiation detector having a fast response time which can be used in trigger logic circuitry.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
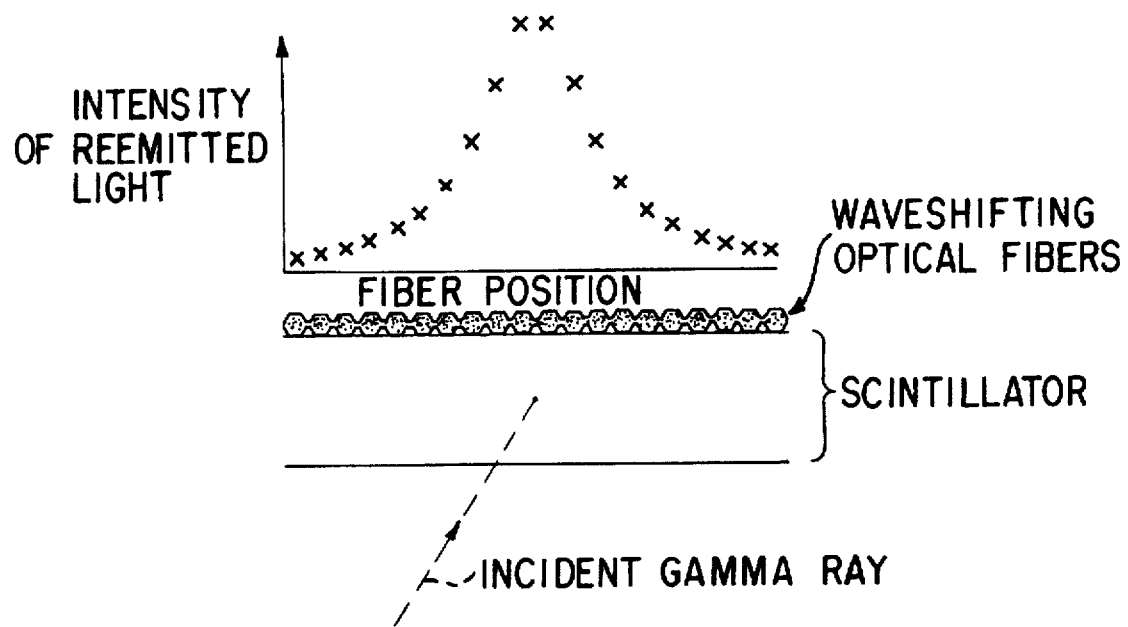
FIG. 1 is an end view of a ribbon of wave-shifting optical fibers on a slab of scintillator.
Figure 2:
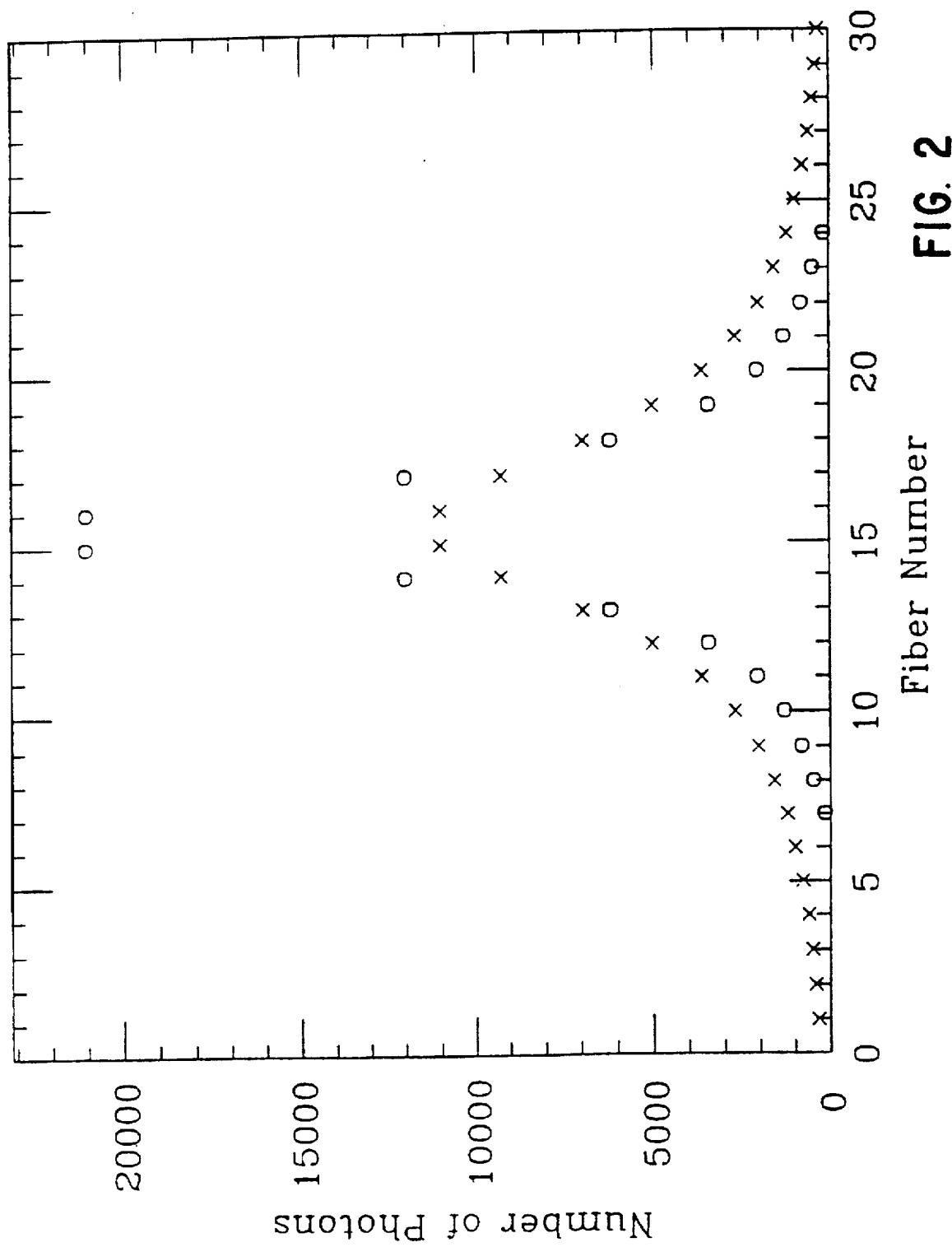
FIG. 2 is a computer simulation of the distribution of light incident on a ribbon of square cross-section optical fibers.

Referring now to the drawings, wherein like reference numerals designate identical or corresponding parts throughout the several views, and more particularly to FIG. 1 thereof, there is illustrated a ribbon of fibers which reemit and transport light to the viewing end of the fibers in sufficient quantity and in a pattern that reflects the position of the original sources of light. This structure takes advantage of wave-shifting optical fibers combined with standard scintillators and both imaging and nonimaging light detection devices such as photomultipliers, multianode photomultipliers, photodiodes or image-intensified Charge Coupled Device (CCD) cameras. These wave-shifting optical fibers have the property of absorbing photons of one wavelength and reemitting them at a longer wavelength. Some of the reemitted light is transported along the fiber while the rest escapes the fiber. The fibers are typically 1 millimeter in diameter and must be highly transparent to the light but also must be opaque to incident light of shorter wavelength. Light transport along the fiber axis is achieved by total internal reflection at the interface between the core of the fiber and a cladding which has a lower index of refraction. The measurement of light from each fiber and the calculation of a centroid of the distribution from the structure of FIG. 1 is demonstrated by the results of a computer simulation of the distribution of the light incident on a ribbon of square cross-section optical fibers as shown in FIG. 2 for scintillators X and O. This result assumes a paint source of scintillator photons due to interaction with radiator, e.g. gamma-rays or neutrons, in the middle of a slab of a scintillator between fibers numbered 15 and 16 for scintillator X. The scintillator thicknesses were 6.3 (X) and 3.0 (O) millimeters with scintillator photons isometrically emitted from the interaction point. The distribution of light from the fibers can be simulated for a given interaction point of radiation in the scintillator. The photons are emitted isotropically so the calculations steps uniformly over polar and azimuth angles. For each pair of angles, a line representing the path of a photon is drawn to the scintillator surface where it intersects a fiber. A plot of the number of photons which hit a fiber shows a sharply peaked distribution whose centroid is the same as the interaction position of the radiation. The width of the distribution can be used to determine the distance between the interaction point and the fiber ribbon.

A physical detector has a distribution which is not as smooth as shown in FIG. 2 because the number of photons detected for each fiber is low. Although the number of photons emitted originally by the scintillator is high (approximately 38,000 per MeV of deposited energy), and although the fibers absorb essentially all of them, only about five per cent of photons which the fibers reemit are transported down the fiber to a light detector. Furthermore the efficiency of the light detector is low. For the number of wavelengths of light to be used, typical photomultipliers are only about ten per cent efficient. The net result is that the smooth distribution of FIG. 2 is approximated by very few photons (10–50) depending on the deposited energy so that the determination of the centroid has an uncertainty which depends on the radiation energy. This uncertainty can be usefully small.

Figure 3:
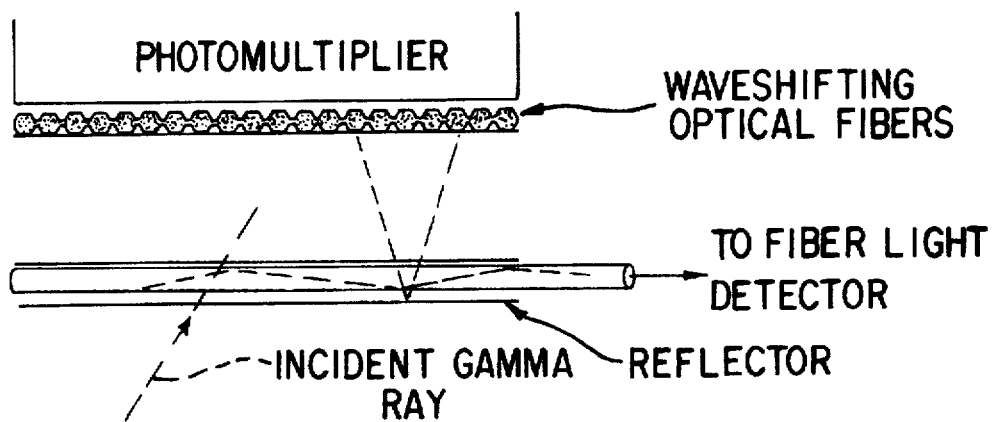
FIG. 3 is an arrangement of a scintillator, fiber ribbons, photomultipliers and reflector for a position-sensitive gamma-ray detector.

Another feature central to the present invention is the recognition that the reemitted light which escapes the fiber can be "recycled" to contribute to an energy measurement, along with scintillation light that passes through the fiber ribbon whether due to fiber spacing and shape or wave-shifting dopant concentration in the fiber, of the incident radiation. Fibers are transparent to their own reemitted light and thus light can follow many paths to one or more photomultipliers including passing through a fiber ribbon and being reflected back through the ribbon toward a photomultiplier. FIG. 3 shows the geometry of the scintillator, fiber ribbons and photomultipliers and several possible paths of the original and reemitted light. The materials chosen for the prototype detector included 1.5 millimeter diameter green wave shifting fibers, photomultipliers with standard bialkali photocathodes and white reflector paint. Other materials can be used which embody the principle of the combination of the scintillator, wave-shifting fibers and light detection devices which provide the properly matched emission spectrum, absorption spectrum and photocathode sensitivity.

Figure 4:
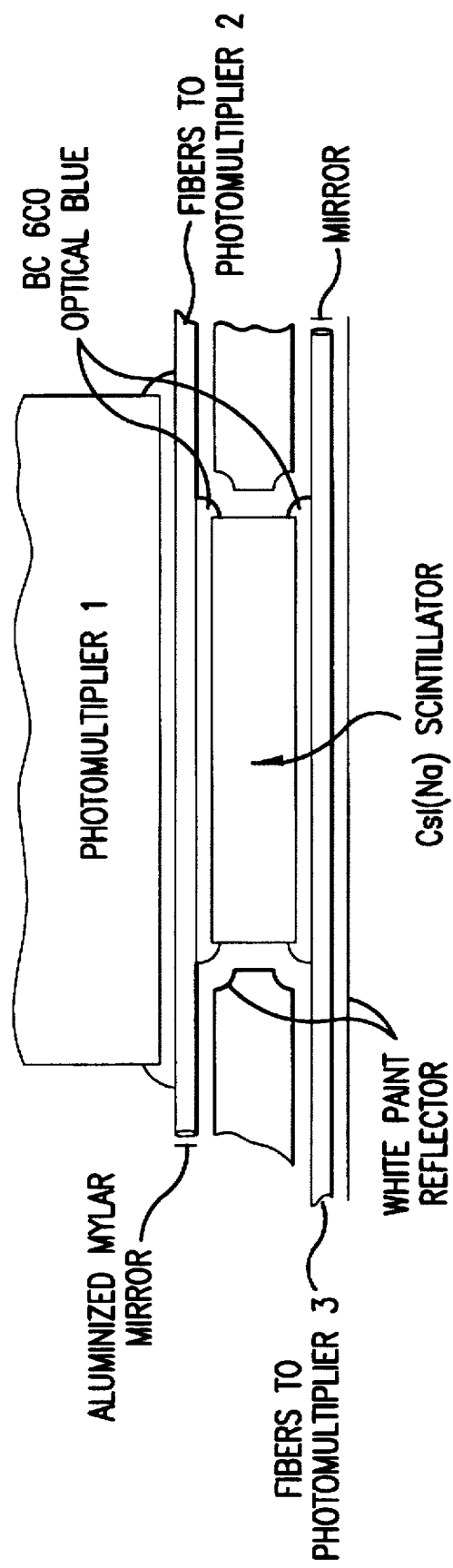
FIG. 4 is a scale drawing of the position-sensitive gamma-ray detector.

FIG. 4 is a drawing of the position sensitive radiation detector in which fiber ribbons are arranged parallel to each other for each other for convenience in positioning the photomultipliers in the test apparatus used to measure the light output, which is independent of the orientation of the fibers. Orthogonal ribbons would be used in practice for two dimensional imaging. However parallel ribbons may be used if desired and will give two independent measurements of one dimensional position information. The FIG. 4 embodiment was constructed in a first stage by gluing together 44 fibers in two ribbons with each ribbon having a width of 33 millimeters and a thickness of 1.5 millimeters, and a length of 21 centimeters. The glue is Bicron Corporation BC600 optical cement. The fibers were glued together only in a region near the scintillator. At the opposite end the fibers were bundled and potted in epoxy which was then machined to be flat in order to provide excellent coupling to the photomultiplier. Therefore the photomultipliers 2 and 3 of FIG. 4 measure the total light transported by each ribbon. Subsequently the ribbons, scintillator and photomultiplier were glued together. The glue provides a good optical coupling between the fibers and the scintillator and between the ribbon and the photomultiplier. A commercial, oil-based white paint was painted on the outer surface of the scintillator and ribbons. The device of FIG. 4 was tested with gamma-rays from $^{137}$Cs (0.662 MeV energy) and $^{22}$Na (0.511 and 1.274 MeV energies) radioactive sources. Standard NIM (Nuclear Instrument Module) and CAMAC (Computer Automated Measurement and Control) electronics interfaced to a VAX based data acquisition program were used for the measurements. CAMAC is a data acquisition standard common in nuclear physics and NIM is an electronic standard for a Nuclear Instrument Module. Data was only collected when there was a coincidence among all three photomultipliers.

Figure 5:
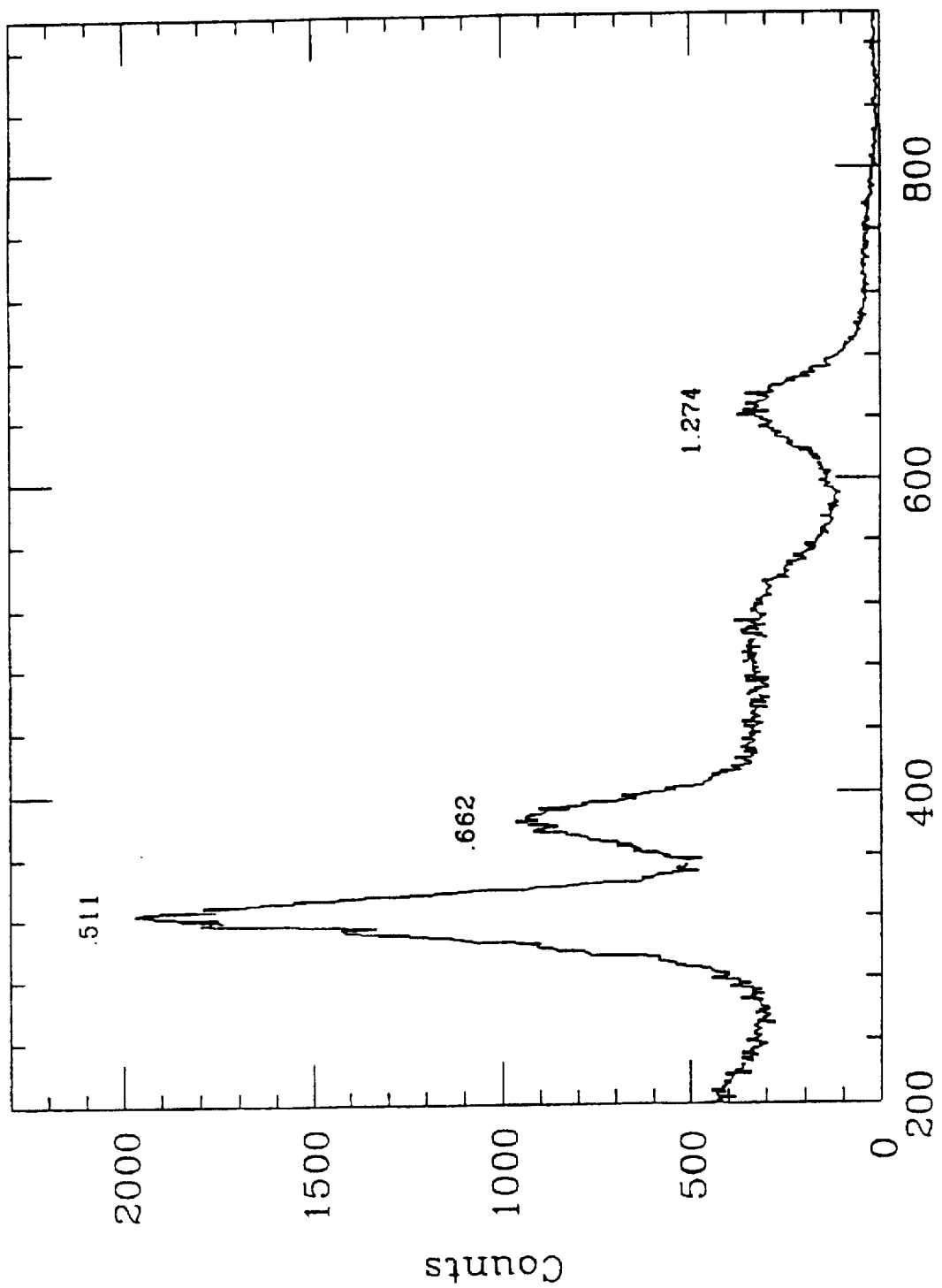
FIG. 5 shows a pulse height spectrum for photomultiplier of FIG. 4 when $^{22}NA$ and $^{137}Cs$ gamma-ray sources are simultaneously placed on the fiber ribbon opposite the photomultiplier having simultaneously positioned gamma-ray sources on the ribbon surface.
Figure 6:
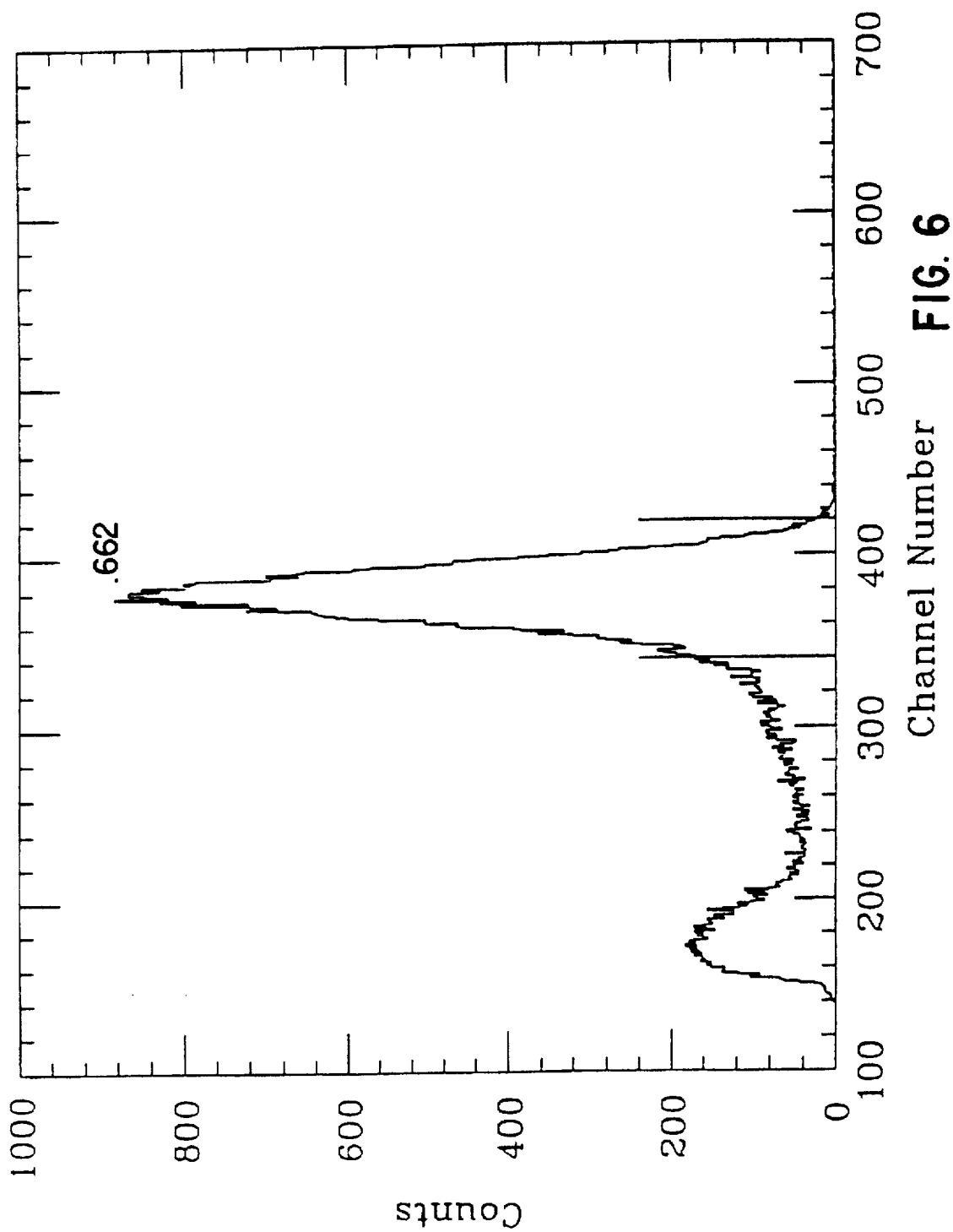
FIG. 6 illustrates a pulse height spectrum for photomultiplier 1 of FIG. 4 using a $^{137}Cs$ source alone.

The photomultiplier labeled 1 in FIG. 4 provided a spectrum shown in FIG. 5 when both radiation sources were used simultaneously. The energy resolution for the 0.662 MeV gamma-rays is approximately 11% FWHM (Full Width at Half Maximum). FIG. 6 shows the energy spectrum from photomultiplier 1 for the $^{137}$Cs source by itself wherein the photopeak at 0.662 MeV and the Compton edge can be clearly seen.

Figure 7:
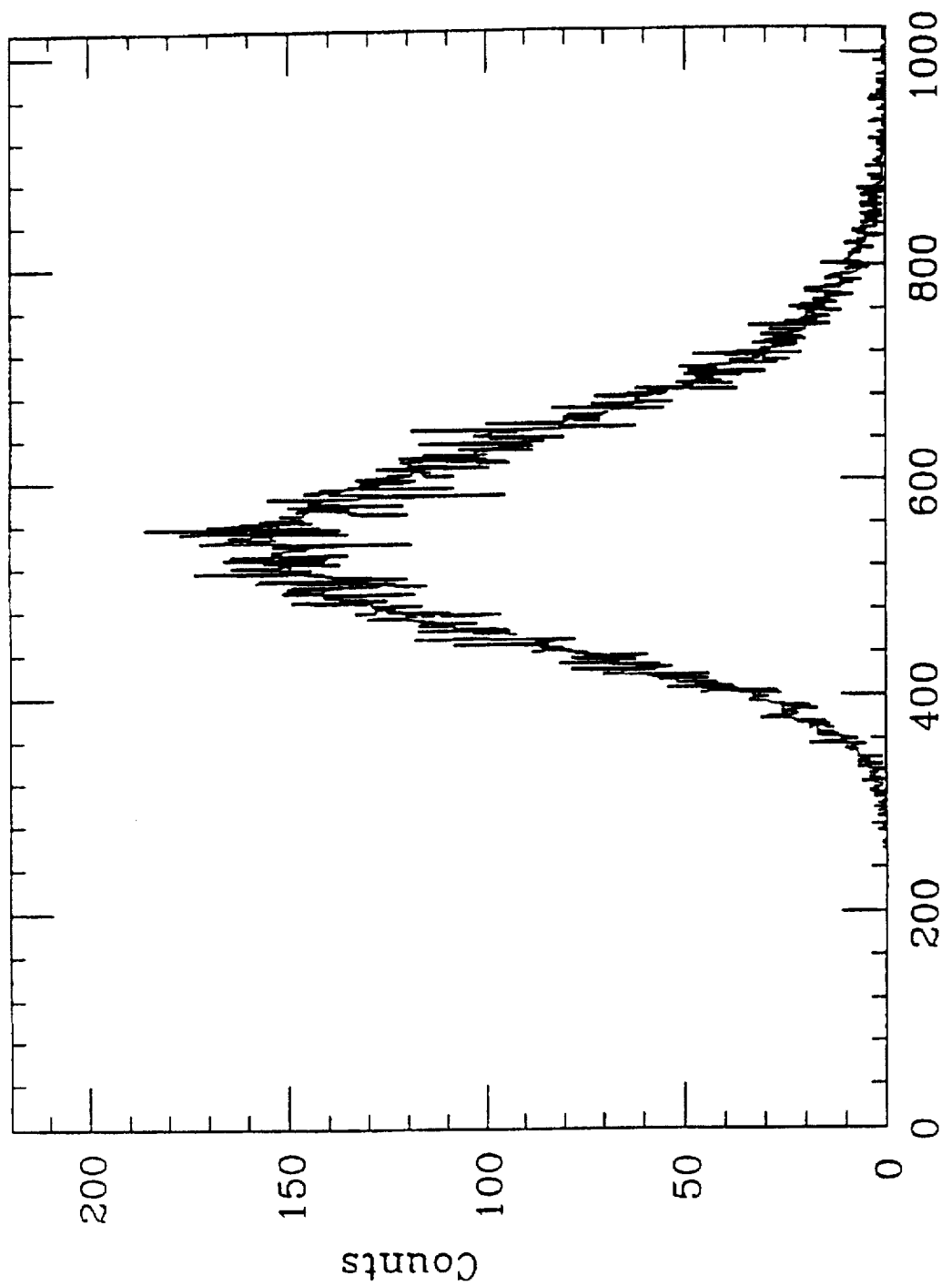
FIG. 7 illustrates a pulse height spectrum for photomultiplier 2 when the pulse height in photomultiplier 1 is between the vertical bars shown in FIG. 6.

The light spectrum for photomultiplier 2 is shown in FIG. 7 for the instance selected by the data acquisition software where the light yield in photomultiplier 1 was within the photopeak. The horizontal axis of FIG. 7 was calibrated in terms of photoelectrons per channel. The mean yield in FIG. 7 is twenty photoelectrons with a similar yield being obtained for photomultiplier 3.

Figure 8:
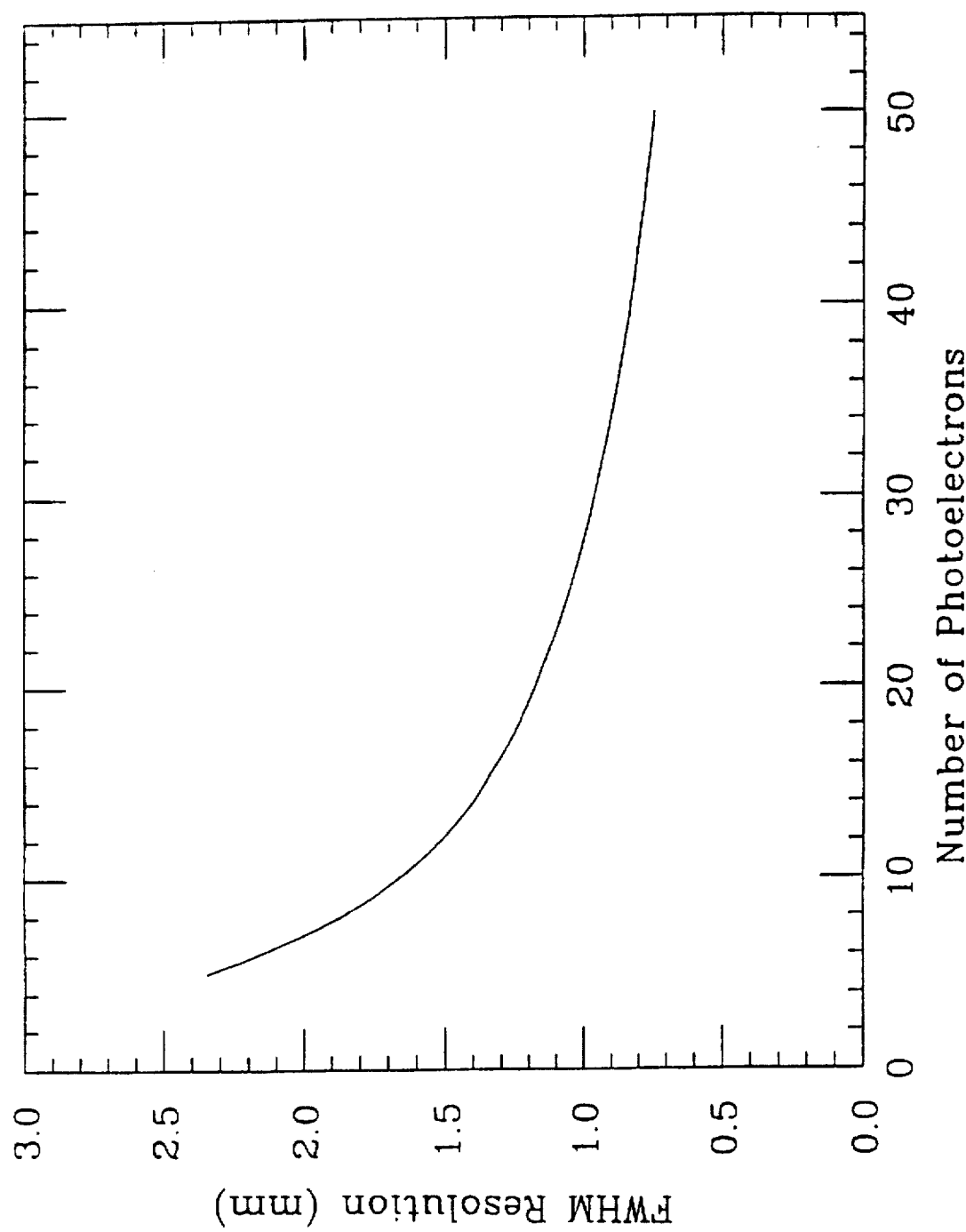
FIG. 8 illustrates the expected position resolution versus photoelectron yield with a 5 millimeter scintillator and 1 millimeter square fibers.

An estimation can be made of the yields which would be obtained with different materials from those yields measured with the system of FIG. 4 of the present invention. Furthermore it is possible to estimate the yield for incident gamma-rays of different energies. It is estimated that approximately fifty photoelectrons would be detected per MeV of deposited energy if square fibers and special green sensitive photocathodes were used. It is also possible that, by using orange wave-shifters, photodiodes or low temperature detectors, the yield could be much higher. The photoelectron yield is an important parameter of the position resolution. If N photoelectrons are detected, the uncertainty in the determination of the centroid is $\sigma/(M)M^{1/2}$, wherein $\sigma$ is the standard deviation of the distribution. FIG. 8 is a plot of the position resolution (Full Width at Half Maximum), versus energy which is estimated to be available using optimal but ordinary materials and methods. The $\sigma$ is obtained from a simulation which is analogous to that shown in FIG. 2 and assumes that the scintillator was 5 millimeters thick CsI (Na) and the fibers were assumed to be 1 millimeter square cross section. Such relatively high resolutions would justify the use of a lead collimator in an Anger camera that was optimized to provide higher than usual resolution. The position sensitivity of the present invention is particularly useful for medical imaging with gamma-rays. The active portion of an Anger camera is the NaI(Tl) scintillator which could be replaced with a thinner and not necessarily flat single piece scintillator covered on both sides with wave shifting optical fibers. Each Anger camera is used with a variety of collimator types rather than having a camera optimized for each particular collimator. The choice of collimator depends on the specific image required and the value of the improved spatial resolution varies from one collimator type to another.

Gamma-ray detectors are also used in oil-well logging where position sensitivity is valuable and furthermore new applications are open in view of having the potential of a curved detector surface using the method of the present invention.

In a second embodiment of the present invention, the problem of the requirement for hundreds of fibers is addressed. As an alternative, consideration can be given to using an image-intensified CCD camera which is however somewhat complicated and cannot operate at the rates usually desired in medical imaging, for example. Furthermore the highest resolution position information is obtained by computer analysis of the stored data so that in order to have a real time image, the photomultiplier array needs to be used with conventional Anger logic which produces a real time image having position resolution which is no better than other existing devices. Thus the image-intensified CCD solution is a viable alternative at low rates, perhaps in industrial radiation imaging, but not for typical medical imaging applications.

In nuclear and particle physics experiments, where it is necessary to determine particle trajectories, use is typically made of one or more position-sensitive detectors such as multiwire drift chambers or proportional chambers. These devices have excellent spatial resolution but a slower response time and thus they cannot be used in logic circuitry that is used to trigger data acquisition which requires a much faster response time.

Accordingly the second embodiment of the present invention incorporates a position-sensitive photomultiplier tube that has a fast response in order to trigger logic circuits that can eliminate the need for hundreds of photomultiplier tubes.

The present invention provides excellent position resolution at high rate in both real time and offline modes using photomultiplier technology called the Crossed Wire Anode (CWA) photomultiplier, which is applied in a unique manner with electronic circuitry to manipulate the CWA output pulses.

The CWA phototube, manufactured by Hamamatsu Corporation, uses a mesh anode with a resistor network to produce four output signals, commonly called x, x', y and y'. The input position, (X, Y), of a light pulse is determined by measuring the four pulses and then calculating $X=x/(x+x')$ and $Y=y/(y+y')$. Position resolution for a light pulse deposited at a point on the CWA input face depends on the number of photons in the pulse. Hamamatsu indicates a resolution versus number of detected photons which, when extrapolated, provides 2 millimeters for 100 detected photons.

The present invention recognizes that the CWA phototube provides a reasonably accurate position for the centroid of a more extended distribution of incident pulses. It is the centroid at the distribution of light from the array of wave-shifting fibers which is required for the scintillator/wave-shifting fiber radiation detectors of the present invention.

Figure 9:
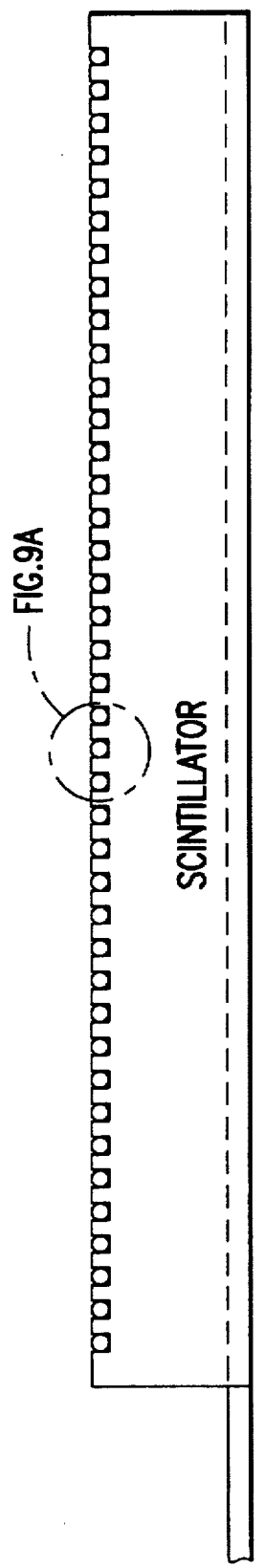
FIG. 9 shows construction of a detector according to the second embodiment of the present invention.
Figure 9A:
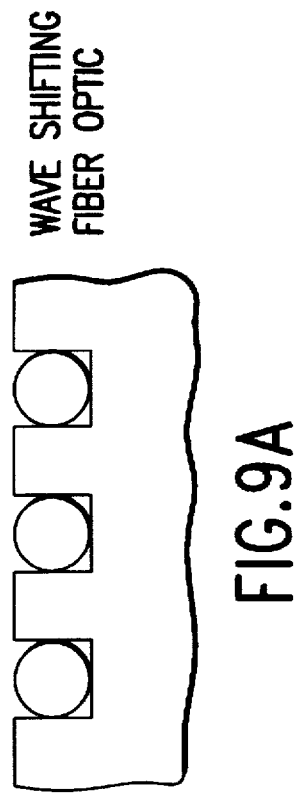

An improved detector of the type having a 10×84×84 mm$^3$ slab of Bicron Corp. BC 422 scintillator with 40, 1 millimeter diameter Kuraray SCSF 81, multi-clad scintillating fibers embedded in grooves on both sides (orthogonally) of the scintillator at two millimeters center-to-center spacing is shown in FIG. 9. A CWA is required for each ribbon for two-dimensional imaging. The scintillator emission peaks at approximately 370 nm and the fibers absorb this light and reemit it at a peak wavelength of 425 nm. Because the fibers are multi-clad, the reemitted light can internally reflect from two interfaces allowing approximately five per cent of the light to propagate down the fiber in each direction. An aluminum mirror glued to one end of each fiber reflects some of the fiber light back to the other end. The entire device is wrapped in a highly reflective aluminized Mylar in order to maximize the probability that scintillation photons are absorbed by fibers.

Figure 10:
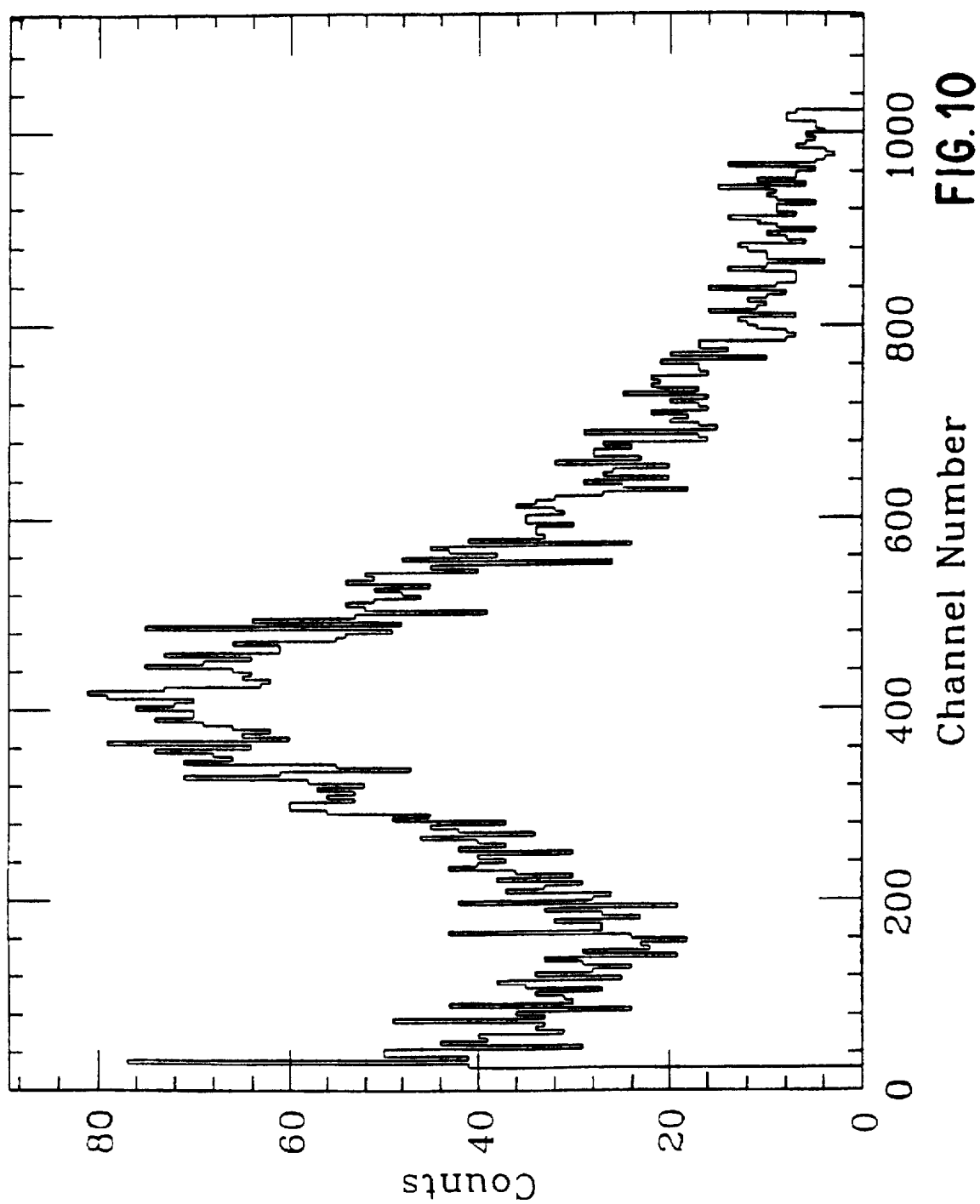
FIG. 10 shows a pulse height spectrum from one of the groups of fiber of the device of FIG. 1.

When the device of FIG. 9 was used to measure the total amount of light emitted from the fibers, a XP 2262 photomultiplier was used to view each set of fibers and a second scintillator was used to provide a coincidence signal for data acquisition. Cosmic ray muons were used as the test radiation and they deposited approximately two MeV of energy in the scintillator. FIG. 10 illustrates a pulse height spectrum from one group of fibers which was calibrated in photoelectrons per channel. The mean number of photoelectrons for the data of FIG. 2 was 58. A similar yield (i.e. sixty photoelectrons) was obtained from the other fiber group.

Figure 11:
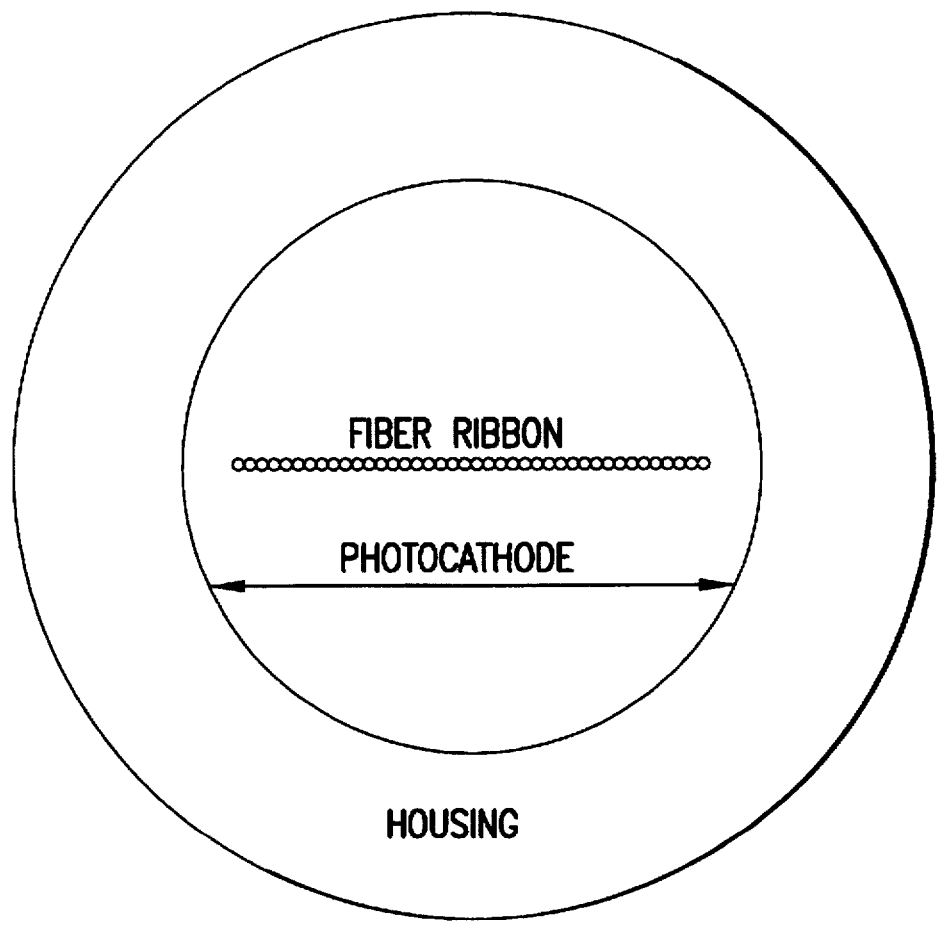
FIG. 11 shows the arrangement of 40 fibers in a flat ribbon on the face of a phototube.
Figure 12A:
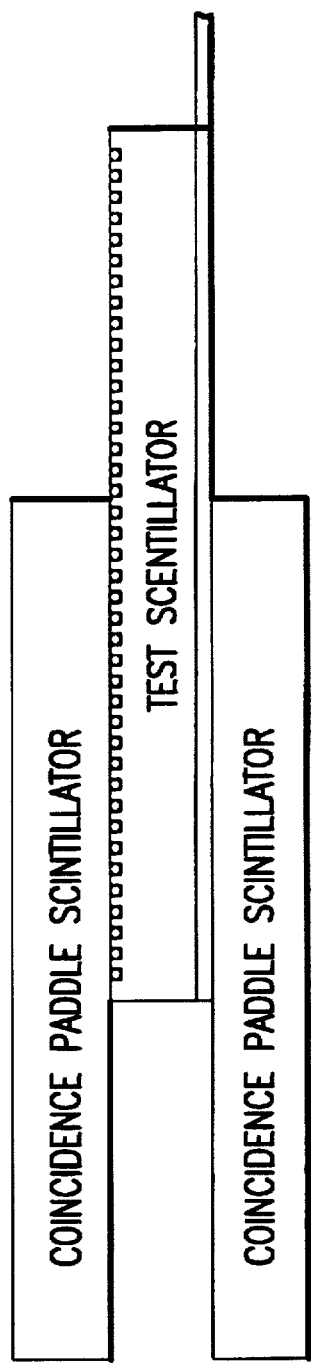
FIG. 12A shows the arrangement of two coincidence detectors to give a sharp edge for spatial resolution measurements.
Figure 12B:
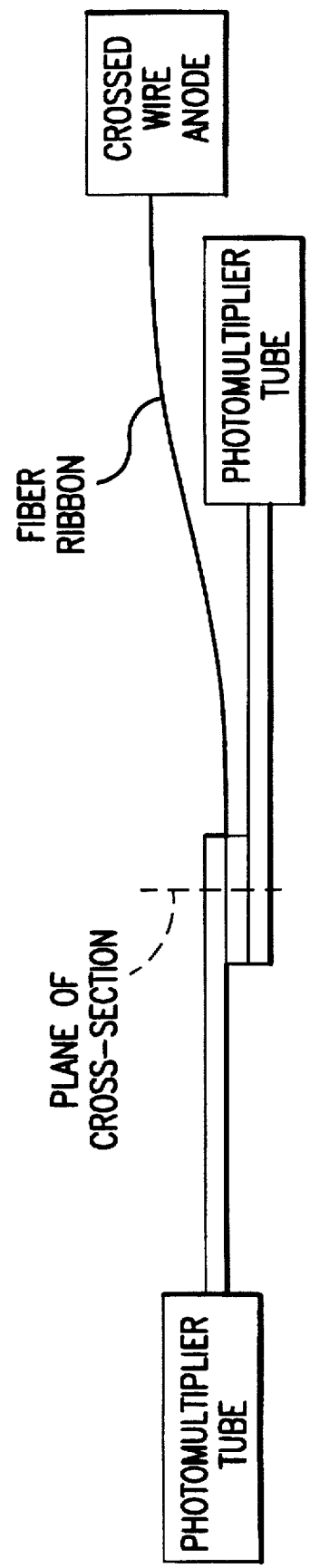
FIG. 12B shows the arrangement of coincidence paddle phototubes and the CWA phototube.

Subsequently the position resolution for one of the fiber arrays using a CWA phototube was measured. The forty fibers of one group were gathered into a flat ribbon 40 millimeters wide and placed on the face of a Hamamatsu R2486 CWA phototube as shown in FIG. 11. The fiber ribbon was parallel to one axis of the CWA phototube. The detector was then placed between two standard scintillator paddles which were used to trigger the data acquisition electronics. These paddles were arranged to define a sharp edge which was used to determine position resolution as shown in FIG. 12. The edge was parallel to one row of fibers and 50 millimeters from the edge of the detector. Once again cosmic rays were used to provide the incident radiation.

Figure 13:
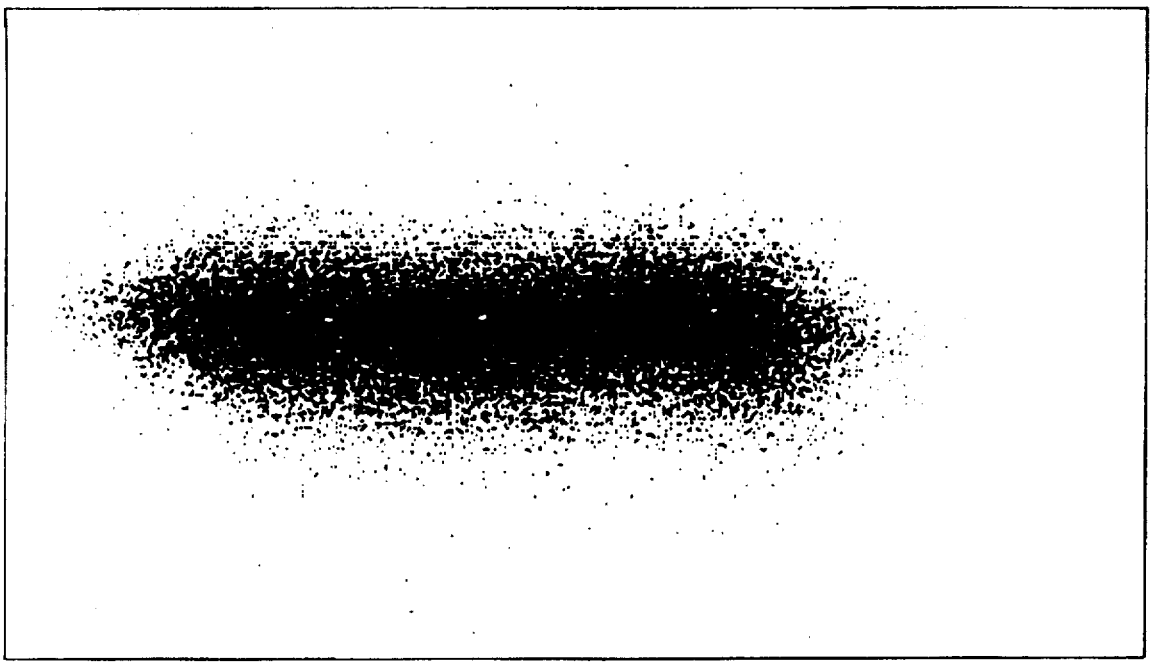
FIG. 13 is a graph showing the software calculated X and Y positions for each event.
Figure 14:
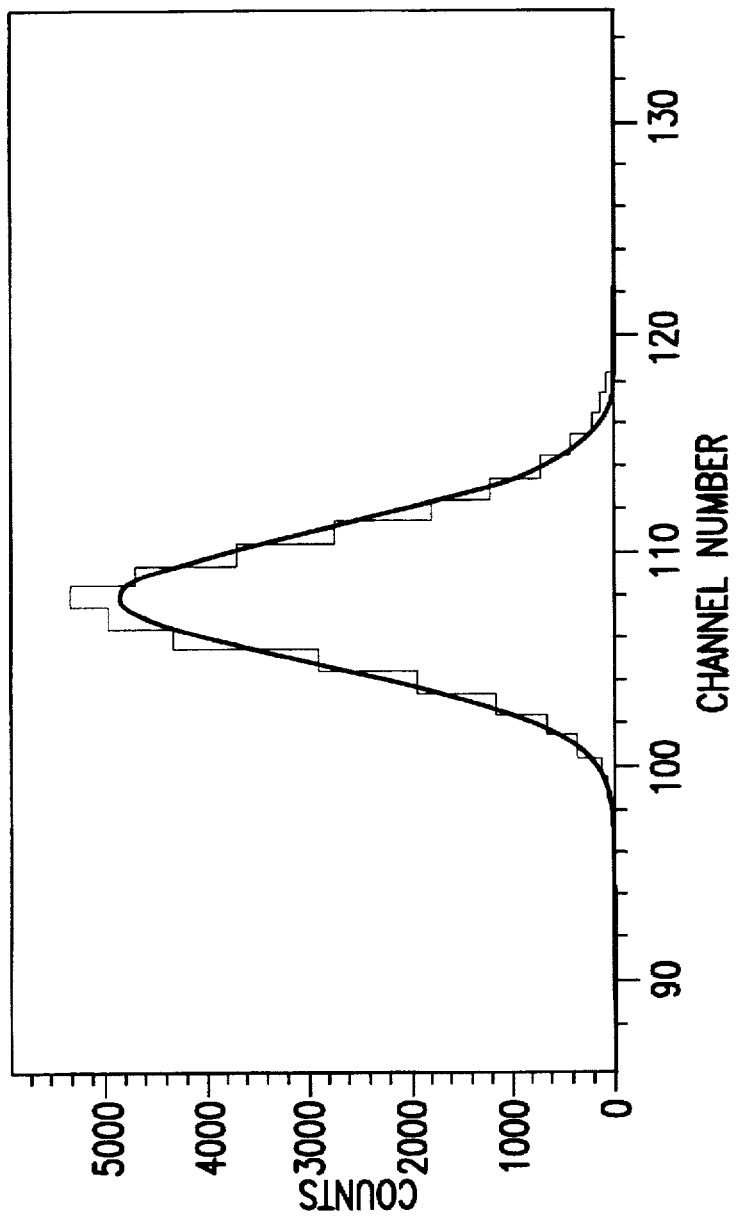
FIG. 14 illustrates the projection of the data from FIG. 13 onto the vertical axis with a Gaussian fit.

The data acquisition electronics digitized the four output pulses from the CWA and online software subsequently calculated the X and Y positions for each event and displayed the result as shown in FIG. 13 which shows the online result for an overnight run. These data were analyzed offline in several ways. First all calculated positions were projected onto the horizontal and vertical axes and because the ribbon was parallel to one of the mesh axes, the projection onto the vertical axis of the FIG. 13 data gives the positional resolution of the CWA. This projection with a Gaussian fit is shown in FIG. 14. The FWHM of the peak is 2.03 millimeters which is in agreement with an extrapolation of the resolution, indicated by Hamamatsu, at higher incident light levels to the 58 photoelectron level of the device of FIG. 9.

Figure 15:
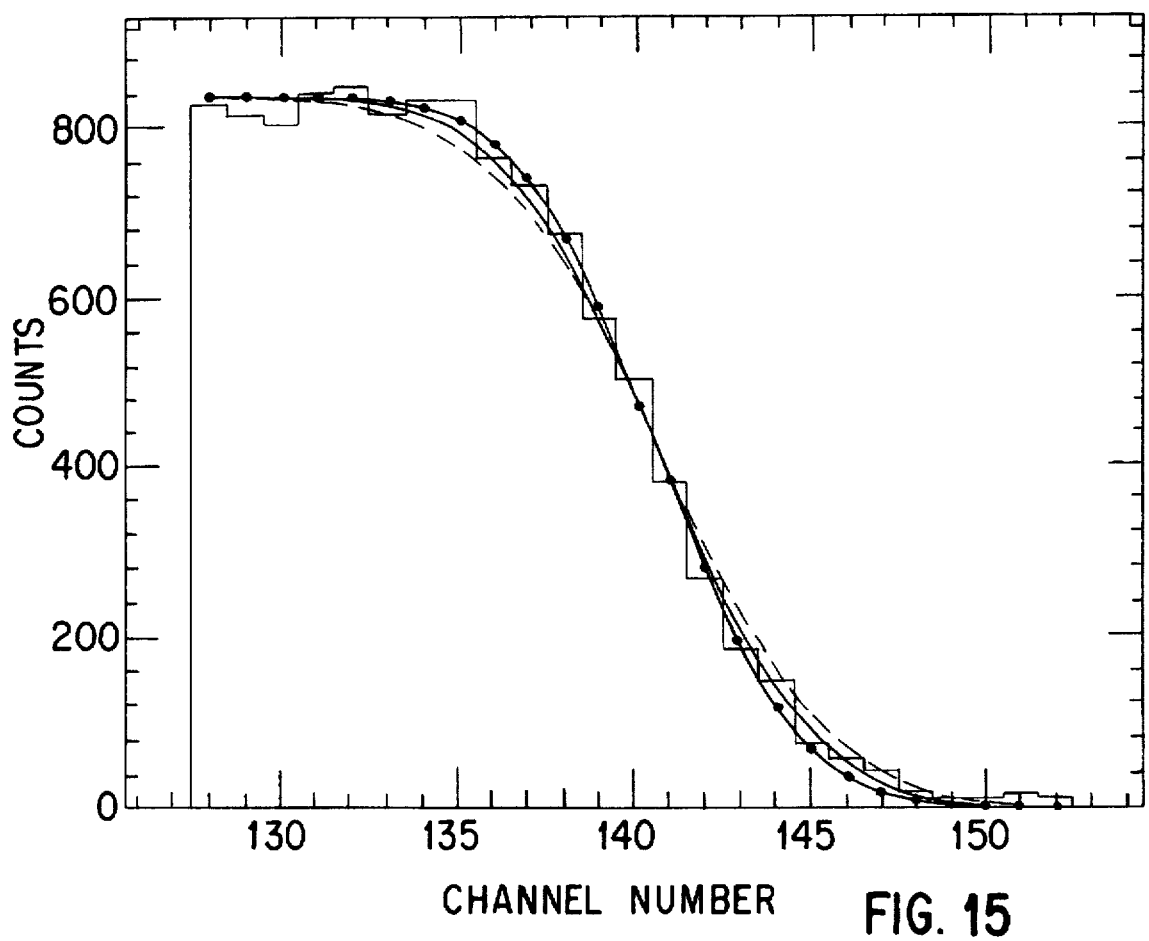
FIG. 15 illustrates the results of projecting data of FIG. 13 onto the horizontal axis with three Gaussian fits.
Figure 15A:
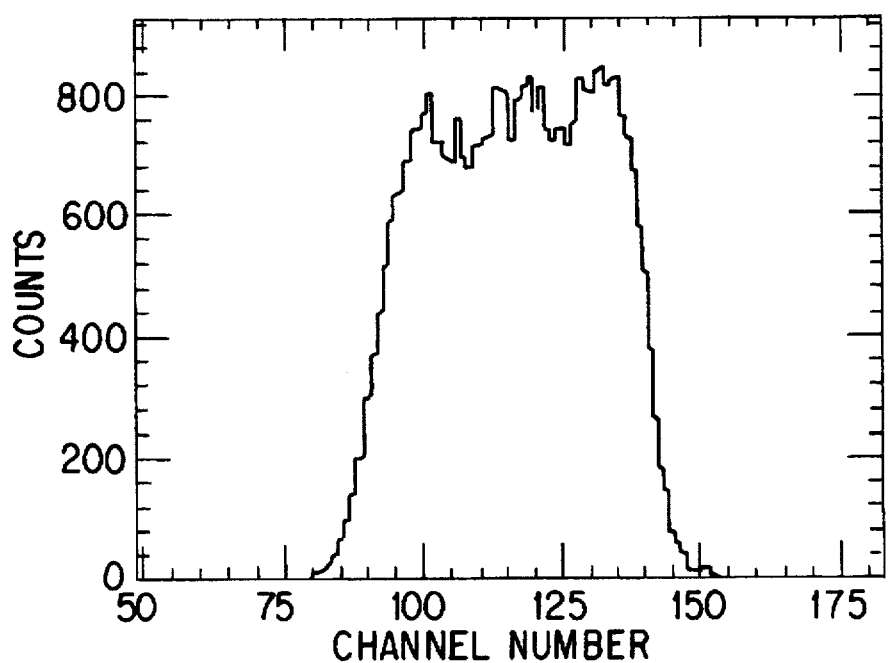

FIG. 15 shows the result of projecting the data of FIG. 13 onto the horizontal axis. The drop in the yield at channel 85 is due to edge of the detector. The sharp drop in yield centered at approximately channel 140 is due to the edge defined by the coincidence paddles. For a cosmic ray passing through the detector at the edge of the coincidence scintillator, scintillation light is never the less spread over the ribbon on both sides of the particle trajectory. The centroid of this light distribution is the quantity which is of interest. The width of the edge indicates that the CWA output pulses can be used with reasonable precision to determine the centroid. The data was fitted with the convolution of a step function and a Gaussian of FWHM equal to 2.6 millimeters. If the FWHM is changed by 10 percent, reasonable fits were still obtained. When the CWA resolution determined from the vertical projection was subtracted in quadrature, 1.2 millimeters was obtained for the spatial resolution as measured on the face of the CWA. This was required to be multiplied by the fiber spacing in order to obtain the intrinsic detection resolution of 2.4 millimeters. This agrees favorably with the results of a simulation of the detector which provides a 3.1 millimeter FWHM.

Fiber spacing for many position sensitive radiation detection applications will be equal to the fiber width so that the 1.2 millimeters discussed above is the expected intrinsic detector resolution given the same light output. Inorganic scintillators used to detect gamma-rays, usually NaI (Tl) and Cs (Tl), produce four times the light of plastic scintillators. Thus 2.6 millimeter resolution can be expected for 500 kev gamma-rays when the intrinsic detector resolution and the CWA resolution are combined. This position resolution depends on the amount of light emitted by the scintillator and is inversely proportional to the square root of the number of photoelectrons emitted by the CWA photocathode.

Figure 16:
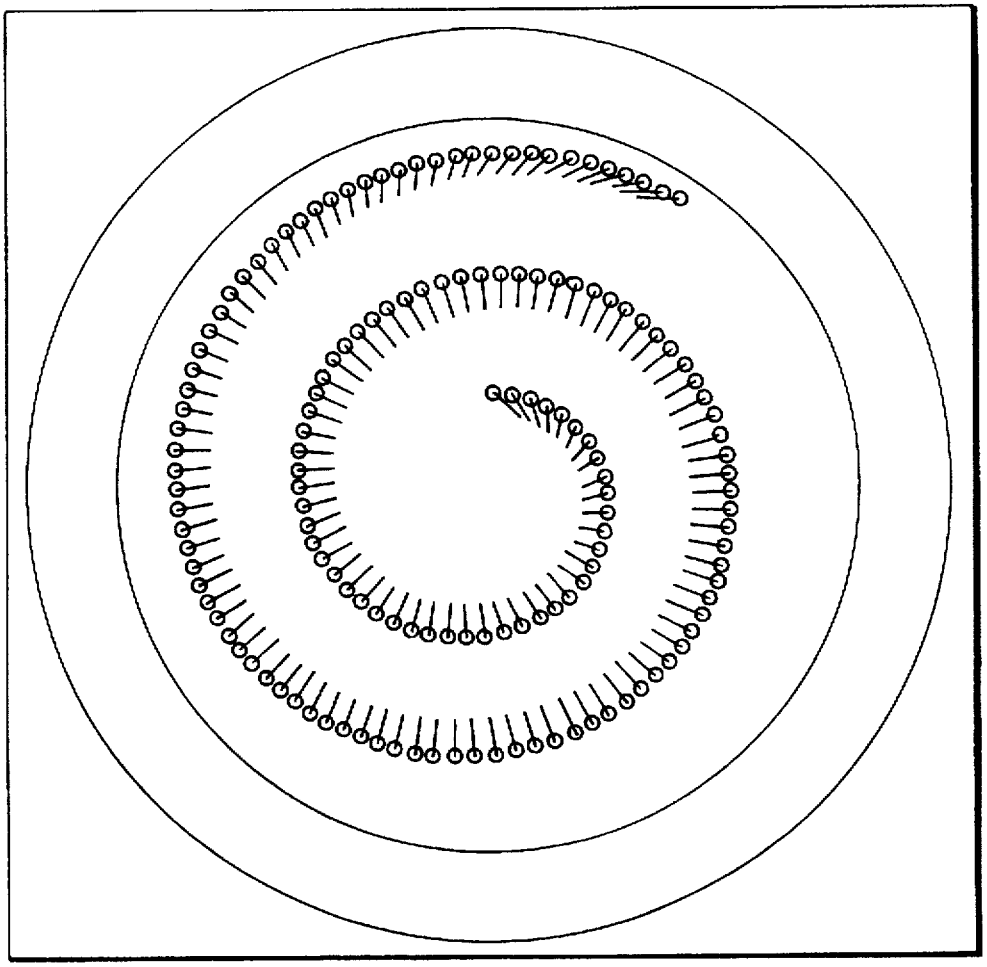
FIG. 16 illustrates a spiral arrangement of fibers having a correction to give the true centroid.

A larger detector will require a larger CWA or it will require a nonlinear arrangement of the fibers on the CWA input face such as a spiral or it could require both the larger detector and the nonlinear arrangement. A nonlinear arrangement requires that all four CWA output pulses be used and that offline analysis must be used to find the centroid. One possible spiral arrangement of the fibers is shown in the FIG. 16. Because the light produced by a single event will be distributed along an arc, the centroid, as measured by the CWA, must be corrected to give the true centroid. The size of the corrections are illustrated in FIG. 16.

Figure 17:
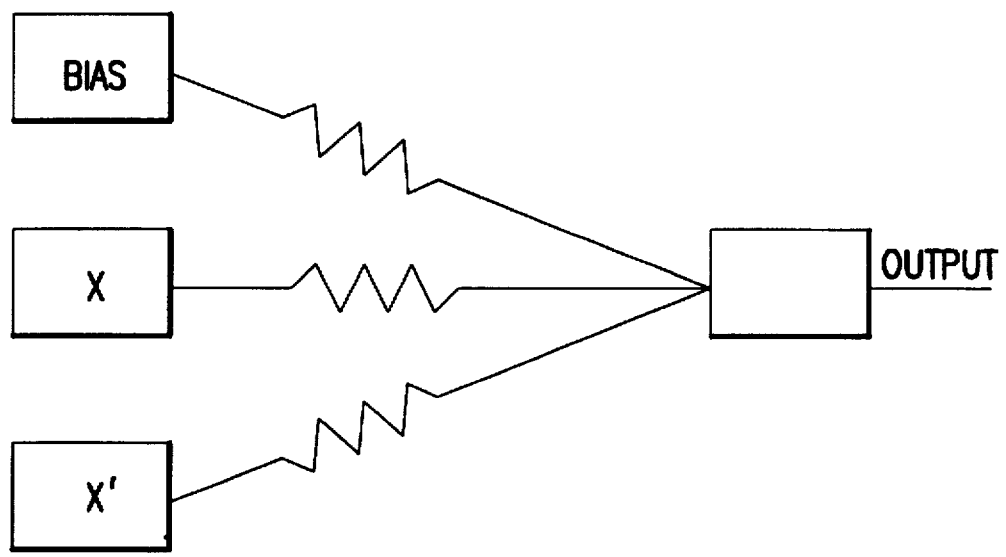
FIG. 17 is a diagram of a neural network constituting the building block of the neural network used in the second embodiment.
Figure 18:
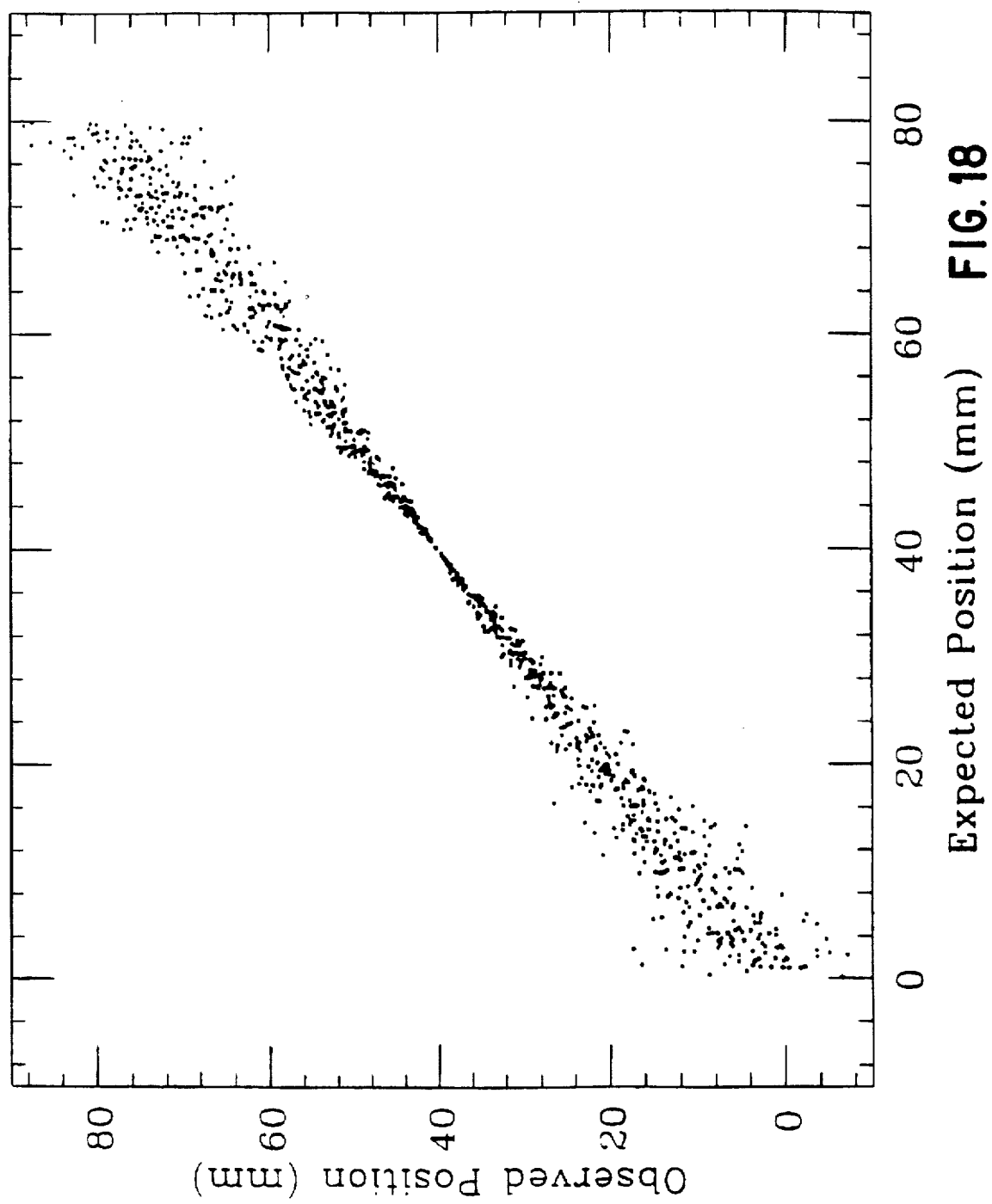
FIG. 18 shows a comparison of the input interaction position with the position determined by the network of FIG. 17.
Figure 19:
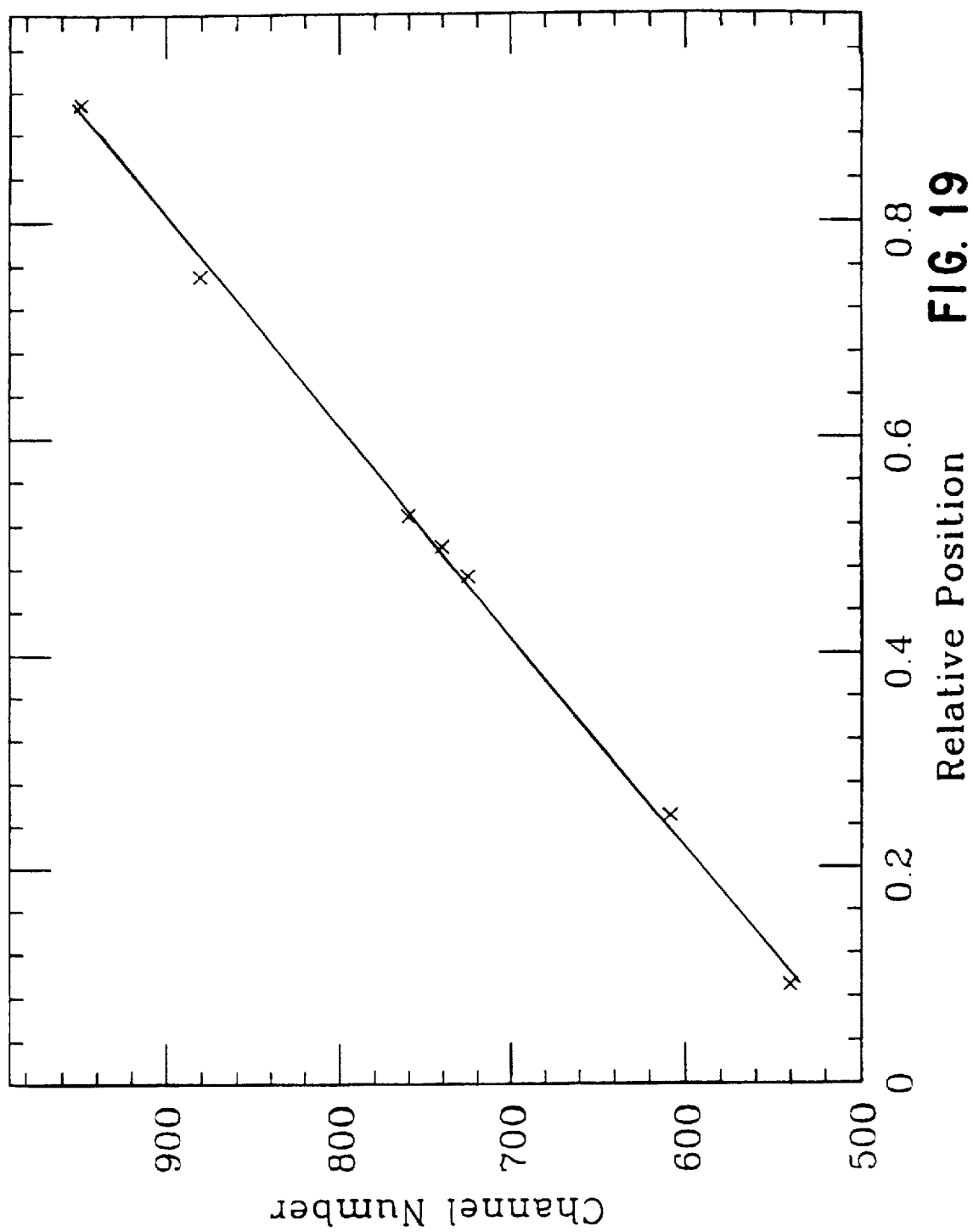
FIG. 19 provides the results of the digitized output pulse for various values of input splitting ratio.

Another feature of the present invention is a real time image obtained with neural networks. Previous methods do not provide a real time image because offline analysis is required to determine the centroid on the CWA face and from that centroid, the centroid in the detector is determined. Existing electronic components which perform division and calculate centroids are too slow for the rate desired in medical imaging or nuclear physics which is a rate of up to 1 Mhz. The method according to the present invention extracts a pulse from the CWA output pulses which is approximately linear in position. As a result the present invention is a designed and simulated circuit of neural networks which can be constructed from high frequency, linear components which perform the required calculation. FIG. 17 illustrates a simple neural network which is the building block of the complete circuit in the present invention. It has an input node for the x and x' CWA outputs, a bias input and a single, linear output. A training set of input data and a test set are created by simulating the detector output. The simulator chooses interaction positions in the detector at random and a Poisson distributed light yield. From these, x and x' were calculated. A back propagation algorithm was used to determine either positive or negative weights. FIG. 18 shows the comparison of the input interaction position with the position determined by the network. A hardware version of the FIG. 17 network uses a single photomultiplier pulse which was divided into various ratios in order to mimic the x and x' pulses of the R2486 CWA. These were input pulses for two channels of a LeCroy 428F Linear fan-in/fan-out module. The required weighting was achieved by using the dc level adjustment, attenuators and an inverter. Another channel of the fan-in/fan-out served as the output node. FIG. 19 shows the results of digitizing the final output pulse for various values of the initial splitting ratio. Because only one amplitude of the initial pulse, that is, the amplitude corresponding to one value of x+x', was used for the data of FIG. 19, the results are more linear than would be expected from the simulation shown in FIG. 18.

Figure 20:
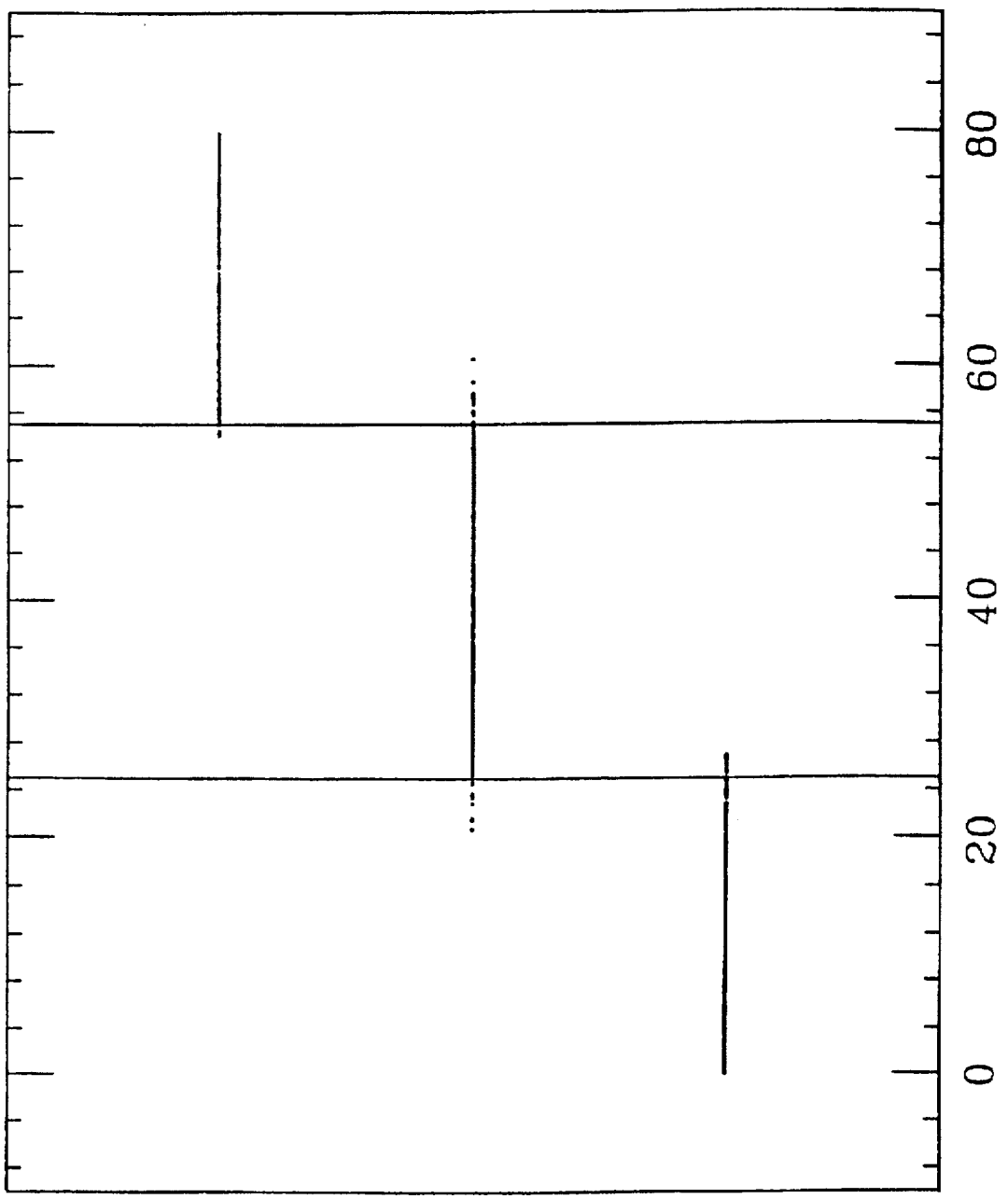
FIG. 20 illustrates results for classification into low, medium and high regions.
Figure 21A:
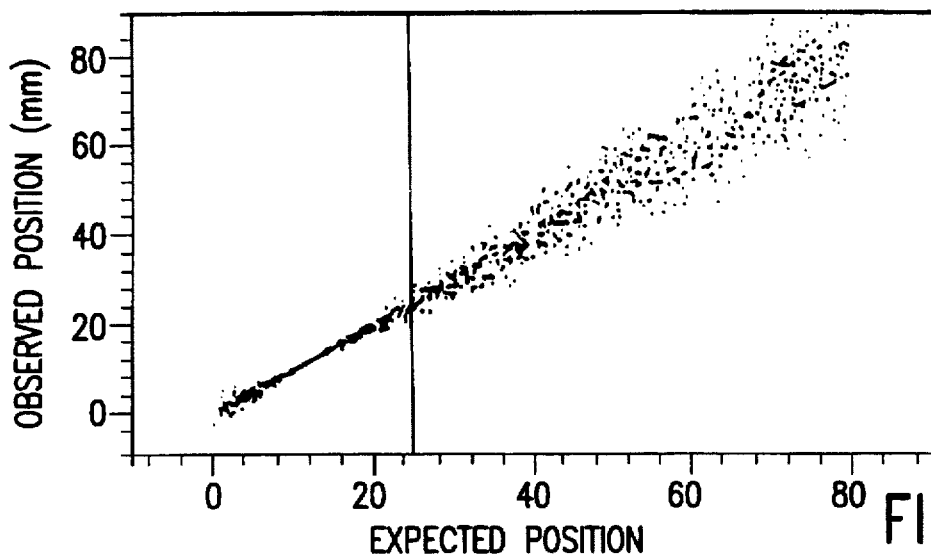
FIGS. 21a–21c illustrate a result of three networks which are each designed for an appropriate region.
Figure 21B:
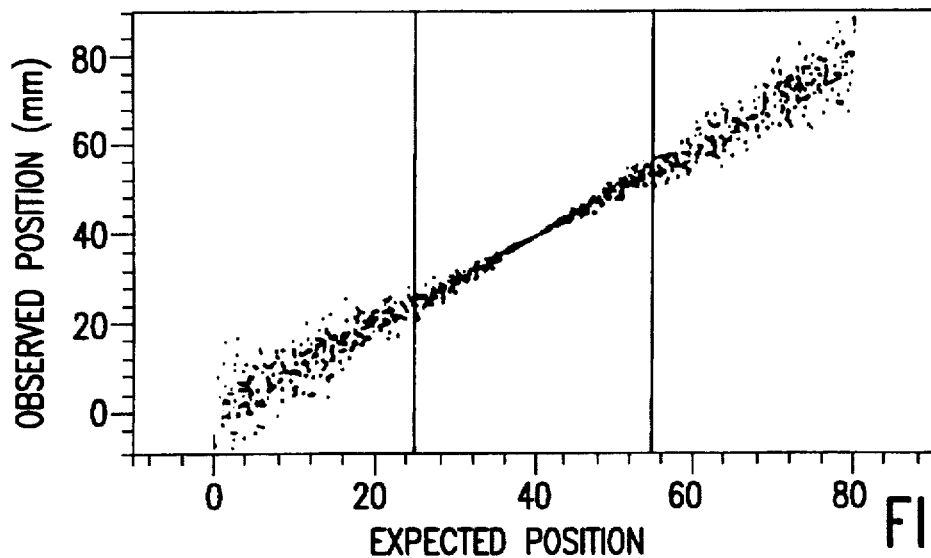
Figure 21C:
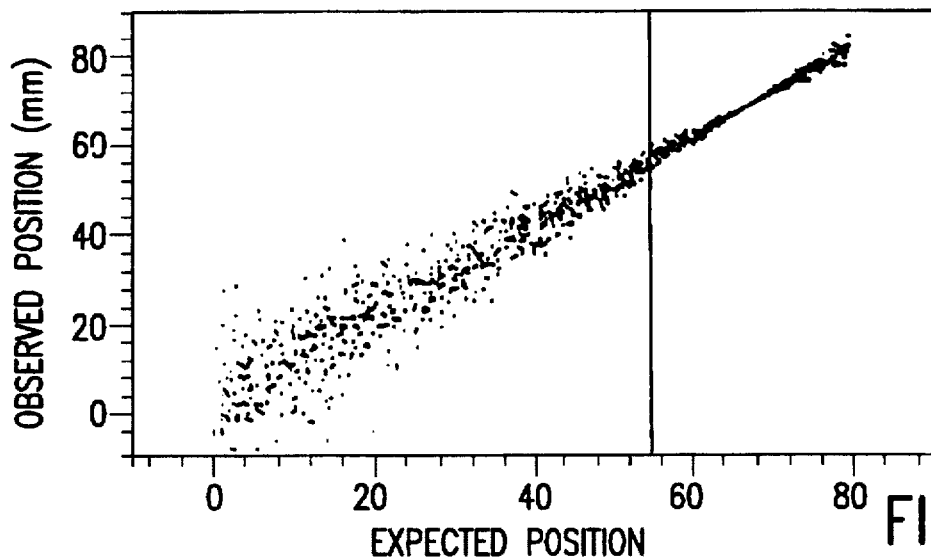
Figure 22:
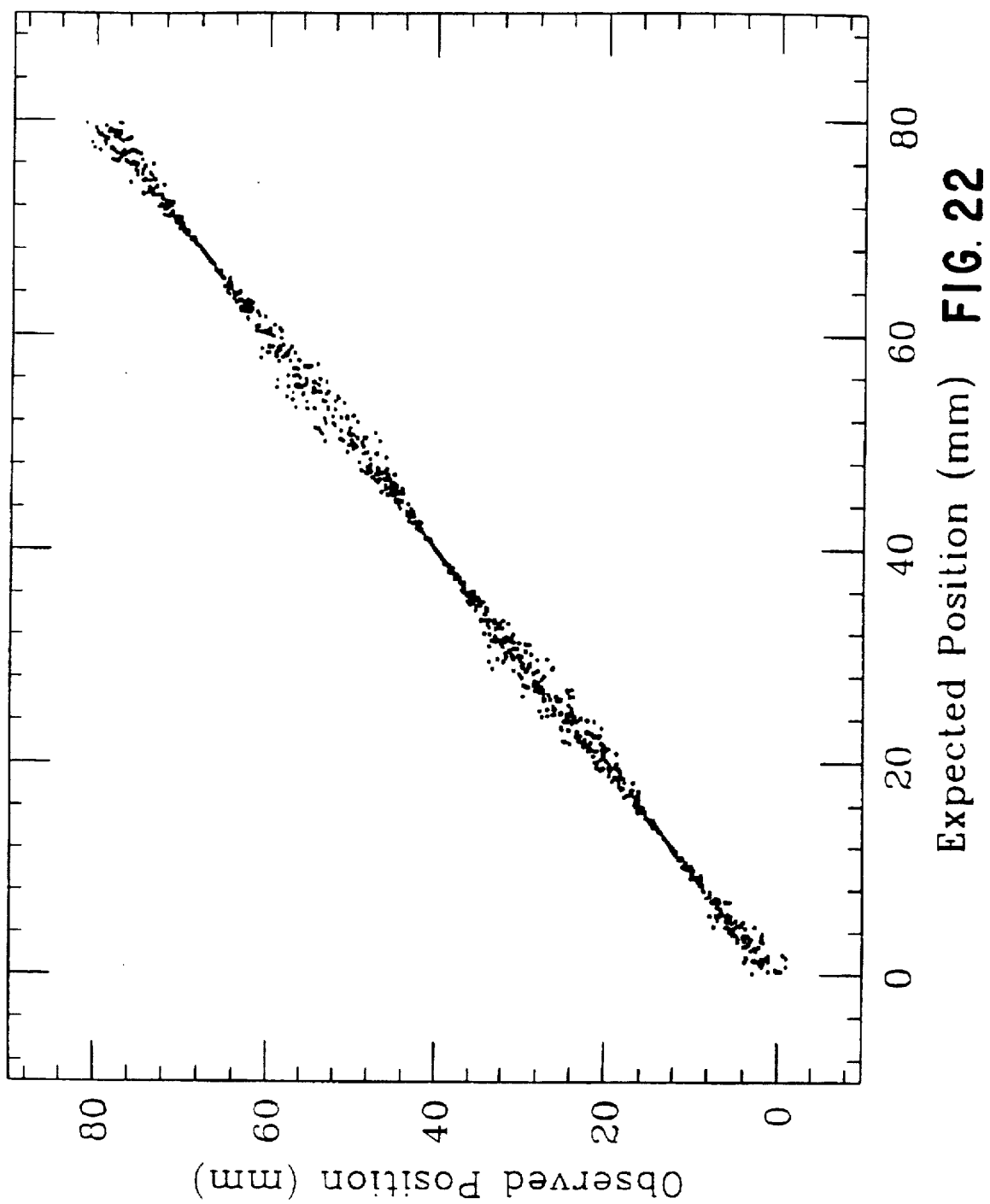
FIG. 22 shows the overall performance for the three networks and the classification network combined.

In order to improve the network performance from the network shown in FIG. 18, the present invention devised an arrangement of three networks which each perform superbly for a region of the detector plus a fourth network which classifies the input pulses as suitable for one of the three networks. FIG. 20 shows the results for classification into low, medium, and high regions. 95% of the events are correctly classified and those events which are not correctly classified are at the boundaries between regions where the accuracies of the two networks are similar. FIG. 21a–21c show the performance of three networks that are each trained only on events from the appropriate region. When these three networks and the classification networks are combined, the overall performance is shown in FIG. 22. With these results, the position uncertainty introduced by the neural networks is small and is useful at 1.9 mm when compared to the combined uncertainty caused by the detector and the CWA.

Figure 23:
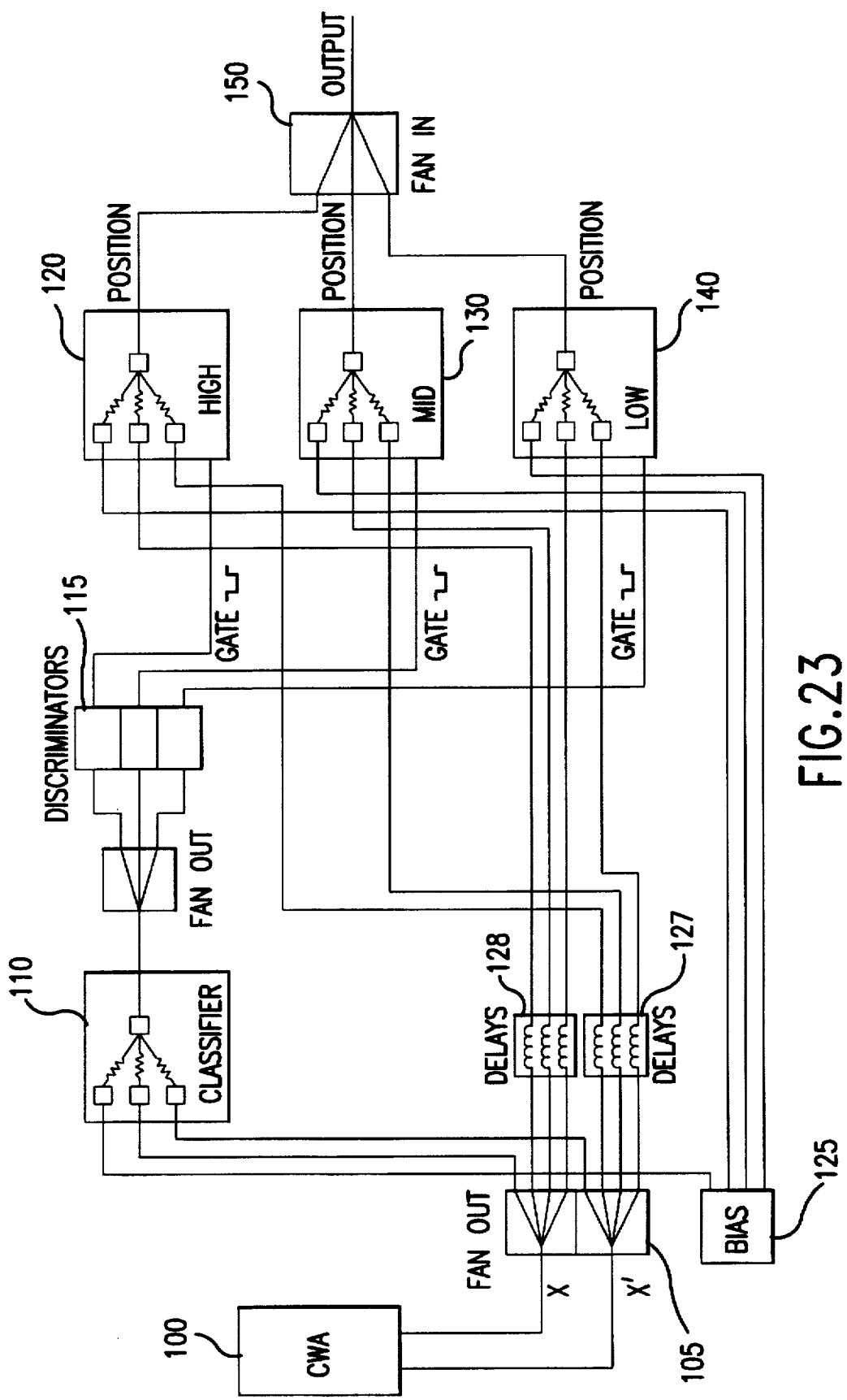
FIG. 23 illustrates a neural network system for processing two output signals x and x'.

FIG. 23 shows an implementation of the proposed neural network system to process two of the CWA's output signals, x and x'. The crossed wire anode 100 has the outputs x and x' fed to the linear fan-in/fan-out module 105. The classification network 110 has an output fed to discriminators 115 which are in turn fed to the three position networks for high 120, low 140 and medium 130 ranges with the final output being determined by the classifier 110. The other input to each of the networks 120, 130, and 140 is the output of the bias device 125. The outputs of the networks 120, 130 and 140 are fed to the output fan-in 150. Each network consist of an operational amplifier in a weighted summation configuration. The Comlinear Corp. CLC 411 operational amplifier has the required characteristics. Copies of the signals fan out to the four networks (the classifier network and the position networks). The output of the classifier network can then fan out to three discriminators which are adjusted to create a gate pulse for one of the three cases based on the output of the classifier network. The gate pulse triggers the appropriate operational amplifier to sum the weighted and delayed output of the CWA. Because only one operational amplifier will produce output for a given event, all three networks fan-in to give the final X-position. A similar implementation is used for the Y-position with the final output being linear with position and as fast as normal photomultiplier tube pulses.

The application of the concept and the method to gamma-ray imaging, neutron imaging, charged particle imaging or other applications is a matter of choosing the appropriate scintillator and subsequently choosing a wave-shifting fiber whose absorption spectrum is matched to the scintillator emission spectrum. NaI (Tl) and CsI (Tl) are commonly used to detect gamma-rays and both emit blue light which requires a blue to green wave-shifting fiber. Neutrons are often detected with $^6$Li loaded glass scintillators. Both gamma-ray imaging and position sensitive neutron detection are accomplished with Anger cameras while the use of photomultipliers, which measure the wave-shifted light that escaped from the fibers, provides an energy measurement. At the same time, when the active area is large enough, an array of phototubes can be used for both energy measurement and a real time image by conventional Anger logic. The CWA technique described above for the second embodiment provides improved resolution over that achieved with Anger logic and at the same time provides a real time image.

Anger cameras for gamma-ray imaging are used with a multihole collimator which produces a position uncertainty comparable to that of the light detector (NaI (Tl) slab with a photomultiplier array). With respect to applications which require such a collimator, improved spatial resolution for the light detector is negated by the collimator resolution, unless the collimator is optimized for high resolution which leads to inefficient gamma-ray detection. However, a neutron sensitive Anger camera can be used without a collimator for neutron detection studies. The superior resolution of the device in accordance with the present invention is then directly observed in the final images.

Figure 24:
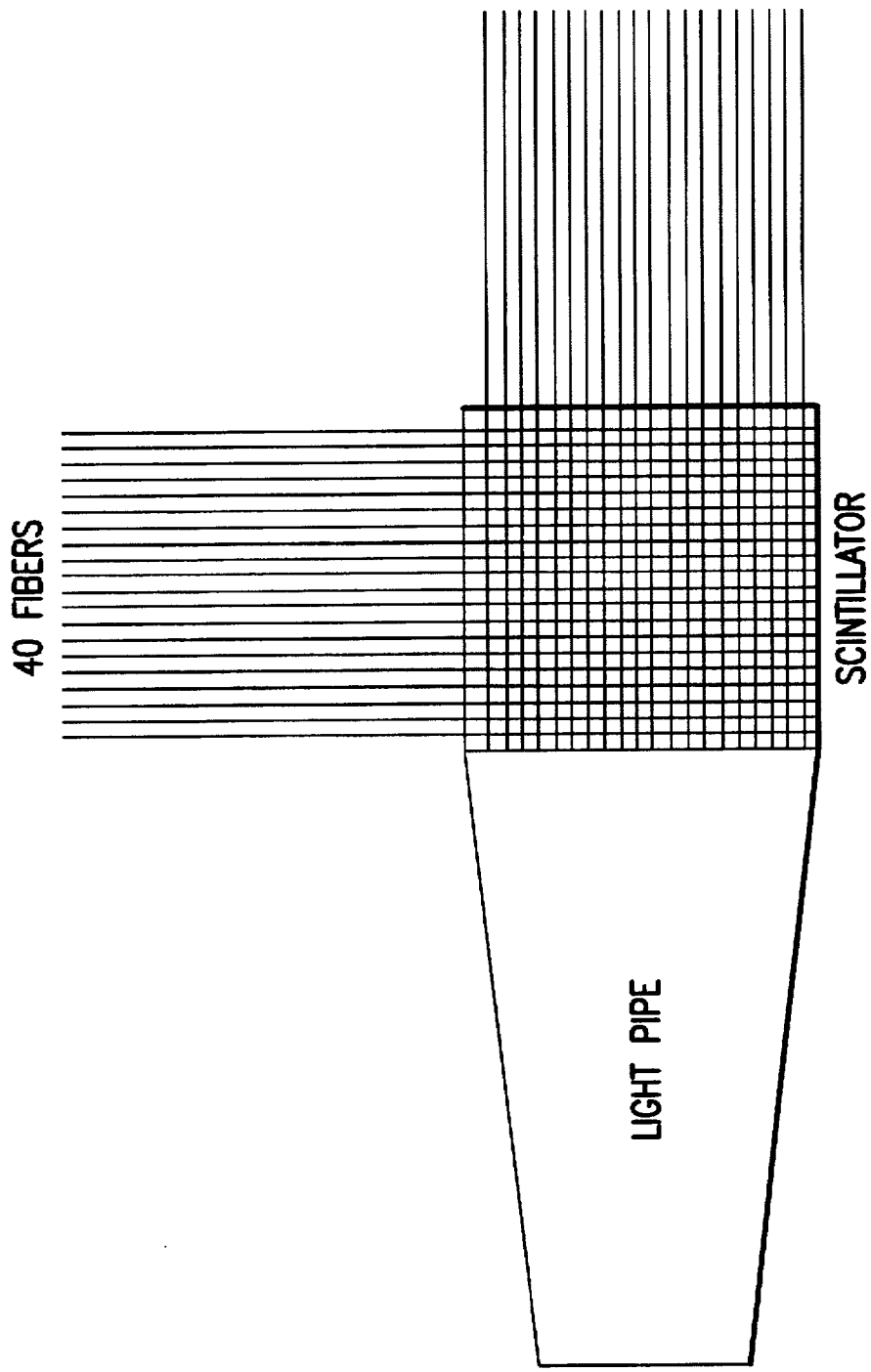
FIG. 24 illustrates a ΔE detector.
Figure 25:
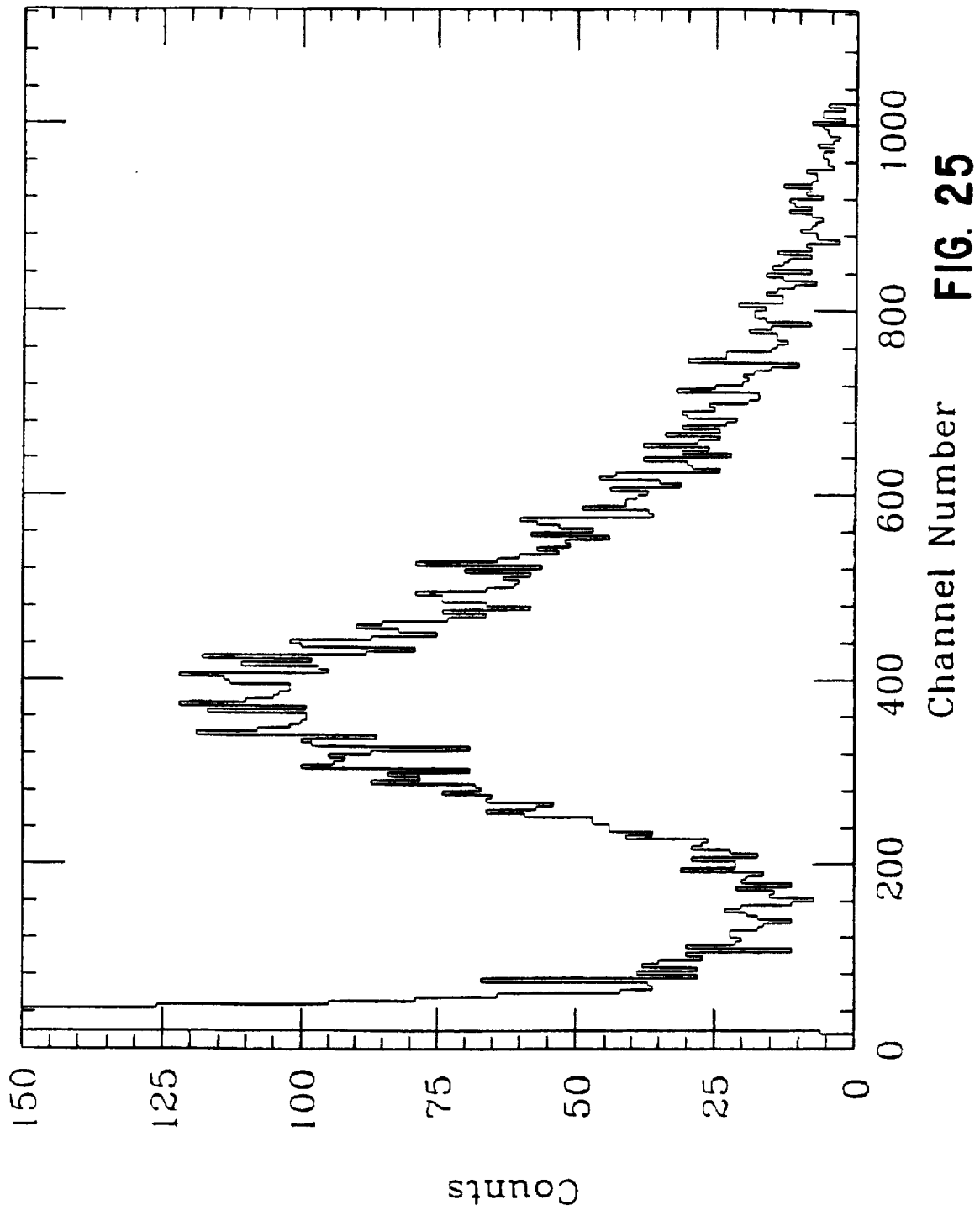
FIG. 25 illustrates a pulse height spectrum of the light transported down the light pipe.

With respect to nuclear and particle physics experiments, it is usually necessary to determine particle trajectories by typically using one or more position sensitive detectors such as multiwire drift chambers or proportional chambers. These devices, while having excellent spatial resolution, have a slow response time. Thus they cannot be used in logic circuits for triggering data acquisition. The neural network described above provides a sufficiently fast pulse that may be used to include position information in the trigger logic. At the same time, by incorporating a concept of the first embodiment, the device of the second embodiment will have the usual properties of a ΔE detector. The important concept is the use of the reemitted light fiber which escapes from the fibers. Much of the light will be totally internally reflected and escape through an edge of the detector. Small angle scintillation photons which never strike a fiber will also contribute. FIG. 24 shows a complete detector which involves a conventional lucite light pipe being added to the embodiments of FIGS. 9 and 13 in order to measure the photoelectron yield for the cosmic rays. The pulse height spectrum of the light transported down the light pipe is shown in FIG. 25 resulting from the structure of FIG. 24. A mean yield of 85 photoelectrons is obtained. Estimates are that revised construction could yield a detection of more than 110 photoelectrons. During offline analysis, this can be combined with the yield from the two fiber ribbons to obtain a total yield of approximately 200 photoelectrons. On the other hand 300 photoelectrons will be typical for a conventional ΔE paddle of similar dimensions without fiber readout.

The combined features of a fast position signal and an energy loss signal provide the present invention with a unique detector for research which can be used to include position information in the trigger and to provide a simpler, cheaper position measurement than wire chambers and simultaneously provide measurement of energy loss.

Obviously, numerous (additional) modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for detecting the interaction position of incident radiation comprising the steps of:

positioning a plurality of wave-shifting optical fibers on one surface of a scintillator;

subjecting said scintillator to radiation which causes, in said scintillator, the release of photons of a first wavelength from said scintillator which are absorbed by said plurality of wave-shifting optical fibers;

measuring photons of a second wavelength reemitted from one end of each of said fibers;

forming a representation of the distribution of reemitted photons for each of said wave-shifting optical fiber; and determining a position where said radiation strikes said scintillator as a function of the centroid of the distribution of detected photons.

2. The method according to claim 1 wherein the width of said distribution is a function of the distance between the interaction point of said incident radiation and said plurality of fibers.

3. The method according to claim 2 comprising the further steps of:

providing at least one light detection device proximal to said plurality of wave-shifting optical fibers;

measuring, by means of said at least one light detection device, photons generated by said incident radiation, which pass through said plurality of fibers together with reemitted, wave-shifted photons which escape from said fibers in order to provide a measure of the energy of said incident radiation.

4. A device for measuring the interaction position of incident radiation, comprising:

a scintillator for emitting light of a first frequency in response to incident radiation;

a plurality of wave-shifting optical fibers positioned adjacent to each other on a surface of said scintillator;

first means for measuring light reemitted by each of said plurality of wave-shifting optical fibers in response to said emitted light from said scintillator wherein said first means for measuring includes a means for determining the distribution of reemitted light along the said plurality of optical fibers in order to provide a determination of the position at which incident radiation interacted with said scintillator.

5. The device according to claim 4 further comprising a second measurement means for measuring said emitted light which passes through said plurality of optical fibers and is not reemitted from said optical fibers plus light reemitted from said optical fibers but not transported to ends of said optical fibers in order to provide a measurement of the energy of said incident radiation.

6. The device according to claim 5 wherein said second measurement means is at least one photomultiplier or at least one-photodiode.

7. A position-sensitive radiation detector, comprising:
- at least one set of a plurality of wave-shifting optical fibers positioned proximal to a respective surface of a scintillator positioned to receive an incident radiation;
- at least one first photomultiplier positioned to receive light reemitted from one end of each of said plurality of optical fibers from each respective set of optical fibers;
- a second photomultiplier positioned proximal to a length of one of said at least one set of wave-shifting optical fibers for receiving light from said scintillator which passes through said one set of optical fibers whereby said at least one first photomultiplier provides a measurement of a position of incident radiation on said scintillator and wherein said one second photomultiplier provides a measurement of the energy of said incident radiation.

8. A position-sensitive radiation detector, comprising:
- at least one set of a plurality of waveshifting optical fibers positioned proximal to a respective surface of a scintillator positioned to receive incident radiation;
- at least one crossed wired anode photomultiplier respectively associated with said at least one set of waveshifting optical fibers, said at least one crossed wire anode photomultiplier providing four output signals;
- means for measuring said four output signals and providing position resolution for the centroid of an extended distribution of incident photons provided by said scintillator and delivered by said plurality of waveshifting fibers of each of said at least one set in order to establish an interaction position of said incident radiation on said scintillator.

9. The device according to claim 8 wherein said means for measuring said four output signals include a neural network circuit including an input node, a bias input, and a single, linear output wherein said input node receives two of said outputs of said crossed wire anode and wherein said linear output provides a real time image measurement.

10. The device according to claim 9 wherein said neural network circuit includes three separate networks for performing measurement on a region of said detector and a fourth network which classifies said input pulses for one of said three networks.

* * * * *